United States Patent [19]

Boulenger et al.

[11] 4,100,062
[45] Jul. 11, 1978

[54] METHOD OF TREATMENT OF AN OXIDIZABLE MATERIAL BY A BIOCHEMICAL PROCESS

[75] Inventors: Paul Boulenger, Le Chesnay; Nicole Angelier; Jean-Pierre Torres, both of Echirolles, all of France

[73] Assignee: L'Air Liquide, Societe Anonyme Pour L'Etude et L'Exploitation des Procedes Georges Claude, Paris, France

[21] Appl. No.: 710,902

[22] Filed: Aug. 2, 1976

Related U.S. Application Data

[63] Continuation-in-part of Ser. No. 637,869, Dec. 4, 1975, abandoned, which is a continuation of Ser. No. 480,304, Jun. 17, 1974, abandoned.

[30] Foreign Application Priority Data

Jun. 25, 1973 [FR] France ................................ 73 23074

[51] Int. Cl.$^2$ ............................ C02B 1/34; C02C 1/12
[52] U.S. Cl. ....................................... 210/14; 210/15; 210/19; 210/63 R
[58] Field of Search ............... 210/15, 3, 14, 19, 63 R, 210/96 R

[56] References Cited

U.S. PATENT DOCUMENTS 3,547,811 12/1970 McWhirter et al. .................... 210/15
3,547,812 12/1970 McWhirter et al. .................... 210/15

*Primary Examiner*—Thomas G. Wyse
*Attorney, Agent, or Firm*—Browdy and Neimark

[57] ABSTRACT

The present invention relates to a method of and an installation for the treatment of a material oxidizable by a biochemical process, in which at least one oxygenation process is applied to a mixture comprising water, the oxidizable material and a biomass, this oxygenation process comprising at least the three following operations:

(1) In an oxygenation zone substantially isolated from the ambient air, establishing a biochemical oxidation system comprising firstly a liquid mass of the mixture to be treated, limited by the lower portion of the oxygenation zone, and secondly a gaseous atmosphere comprising oxygen, surmounting the liquid mass and limited by the upper portion of the oxygenation zone;

(2) Circulating in the oxygenation zone by means of a mechanical oxygenation device, one of the constituents of the biochemical oxidation system, namely the portion of the liquid mass and the portion of the gaseous atmosphere, each limited by the portion of the oxygenation zone, in contact with each other;

(3) Supplying the oxygenation zone with at least one oxygenation gas comprising at least 50% by volume of oxygen, thereby providing the oxygen necessary for the biochemical oxidation.

The oxygenation process may be of the continuous single-stage or multi-stage type and the method of the invention finds its particular application to the biological processing of waste or sewage water.

9 Claims, 24 Drawing Figures

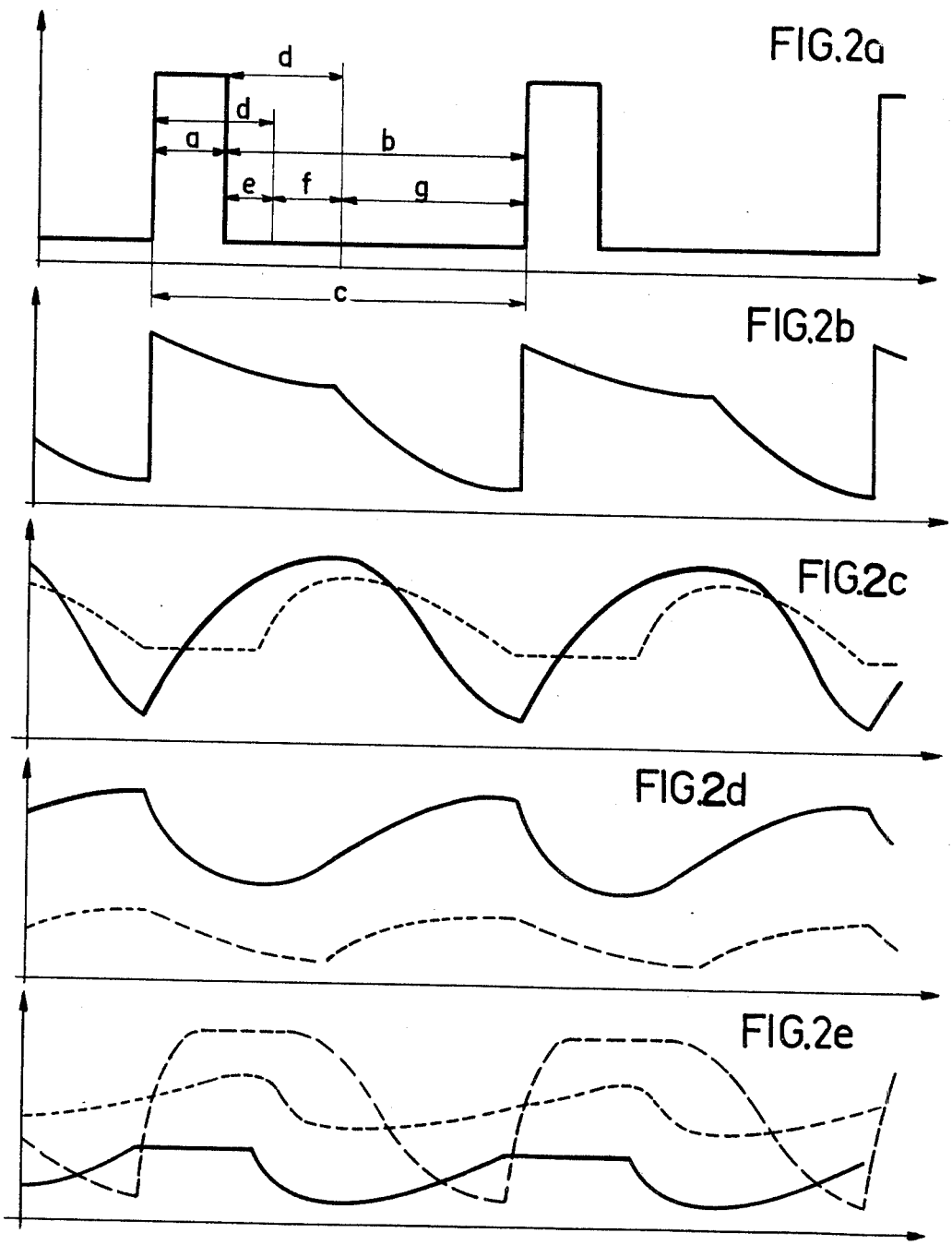

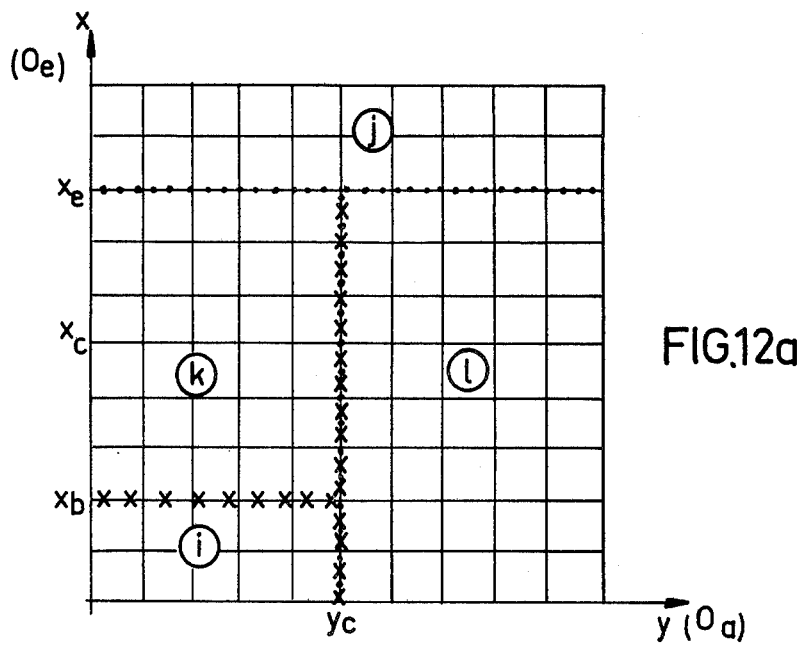
FIG.12a
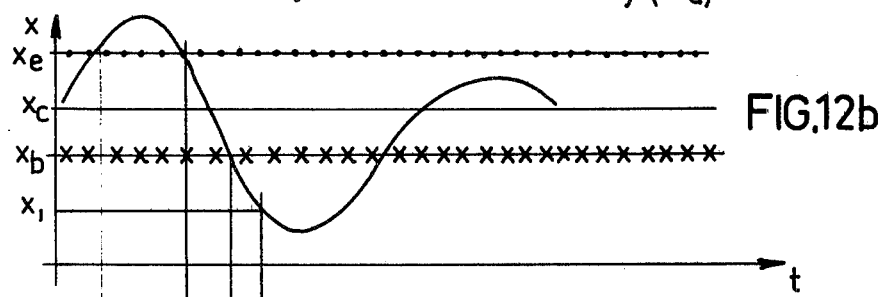
FIG.12b
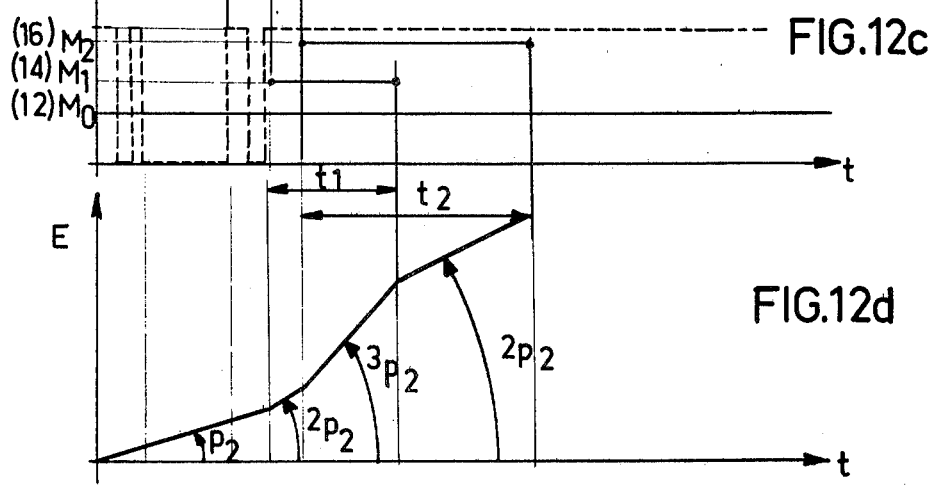
FIG.12c
FIG.12d

METHOD OF TREATMENT OF AN OXIDIZABLE MATERIAL BY A BIOCHEMICAL PROCESS

This application is a continuation-in-part of copending application Ser. No. 637,869 filed Dec. 4, 1975, abandoned, which in turn was a continuation of Ser. No. 480,304 filed June 17, 1974, abandoned, the contents of which are hereby incorporated by reference.

The present invention relates to a method of treatment of an oxidizable material by a biochemical process. The invention relates more particularly to any treatment of a material oxidizable by a biochemical process, in accordance with which there is effected at least one oxygenation of a mixture comprising water, the said oxidizable material and biomass.

Although the field of application of the present invention is not restricted to the technical sector defined below, but also includes other industrial sectors, for example that of fermentation, the present invention is described within the framework of a biological purification process of waste water.

The present invention has for its object a method of treatment of an oxidizable material by biochemical process, comprising at least one oxygenation of a mixture comprising water, the oxidizable material and a biomass, having the following objects:

(1) Operative methods of oxygenation are provided which make it possible to reduce or even to eliminate the quantity of blow-out gas evacuated per unit of time from the oxygenation zone, while on the one hand retaining inside the oxygenation zone a pressure compatible with the mechanical strength of the equipments employed, and on the other hand maintaining the concentration of gaseous oxygen of the gaseous atmosphere in the oxygenation zone permitting a satisfactory transfer of oxygen to the biomass, especially at a constant mechanical power supplied by the mechanical oxygenation means.

(2) Methods of regulation of the biochemical oxidation regulation system present in the oxygenation zone make it possible to control the quantity of oxygen transferred per unit of time closely from the source of the oxygenation gas to the biomass, in dependence on the quantity of oxygen consumed per unit of time by this mass.

As regards the first object, the present invention is more particularly directed to defining conditions of operation for oxygenation of the single-stage continuous type and permitting in this case the reduction or even the elimination of the necessity of evacuating a blow-out gas from the oxygenation zone. In short, the present invention has more particularly for its object to rehabilitate oxygenation of the single stage continuous type in industrial practice.

As regards the second object, the present invention envisages more particularly the conditions of regulation permitting on the one hand a faithful representation of equivalency between the quantity of oxygen transferred per unit of time to the biomass, and the quantity of oxygen consumed per unit of time by this latter, and on the other hand to counteract to the maximum extent the relatively long response times and correction times of the biochemical oxidation system.

In order to find a solution satisfying the first object previously defined, attention has been given to the physical mechanisms acting during the course of the oxygenation of the pre-treated waste water to give a progressive enrichment of the gaseous armosphere of the biochemical oxidation system in carbon dioxide and in nitrogen, and consequently to generate a blow-out gas creating the necessity of evacuation of this latter.

It has thus been found that the above-mentioned enrichment, and in consequence the corresponding transfer of carbon dioxide and nitrogen from the liquid mass to the gaseous atmosphere of the biochemical oxidation system results essentially from the fact that, at any moment of the oxygenation of the pre-treated waste water, the concentration by weight of carbon dioxide and nitrogen is constantly greater in the liquid mass than in the gaseous atmosphere of the said biochemical oxidation system.

Correlatively, during the course of the oxygenation of the pre-treated waste water, the conditions necessary to a continuous mass transfer of carbon dioxide and nitrogen from the liquid mass to the gaseous atmosphere of the oxygenation zone are constantly verified, and this is the primary and fundamental cause of the de-gasing of the carbon dioxide and the nitrogen.

If on the contrary it is possible to find methods of operation permitting at any moment of the oxygenation to reverse the conditions of mass transfer previously specified, that is to say to establish a mass concentration in carbon dioxide and in nitrogen which is greater in the gaseous atmosphere than in the liquid mass of the biochemical oxidation system, the phenomena previously described will then be reversed and there will occur a re-solution of the de-gasified carbon dioxide and nitrogen in the liquid mass of the bio-chemical oxidation system.

However, as at least part of the liquid mass in question (mixed liquor) is evacuated continuously or non-continuously from the oxygenation zone, the carbon dioxide and the nitrogen resulting from the oxygenation of the pretreated waste water will then be evacuated from the oxygenation zone, no longer in an essentially gaseous form with the blow-out gas, but in an essentially dissolved form with the mixed liquor. Under such conditions, the result will be an oxygenation with a "liquid blow-out" and not with a gaseous blow-out from the oxygenation zone. Correlatively, the quantity of blow-out gas evacuated per unit of time from the oxygenation zone will be substantially reduced or even eliminated, while the first object previously defined will then be achieved.

According to the invention, it has precisely been discovered that a re-dissolving of the carbon dioxide and the de-gasified nitrogen in the mixed liquor present in the oxygenation zone may be obtained by the combination of the following methods of operation without omitting one single operation:

(1) The supply of the oxygenation zone with the oxygenation gas is effected by the introduction of this latter into the centre of the liquid mass of the biochemical oxidation system in a limited zone of rising gaseous circulation, belonging to the liquid mass concerned.

(2) When the oxygenation gas is fed into the oxygenation zone, it is the only gas introduced into the above-mentioned zone of rising gaseous circulation.

(3) The supply of the oxygenation zone with oxygenation gas is effected fractionally, that is to say it comprises a number of successive periods, each including an alternate supply period of oxygenation gas followed by an alternate interruption of supply of oxygenation gas.

(4) The duration of the alternate supply period referred to above is at most equal to the mean duration of the path of the bubbles of oxygenation gas from the point of introduction of the said gas at the heart of the liquid mass up to the interface between the gaseous atmosphere and the liquid mass of the biochemical oxidation system. For a given duration of the above-mentioned supply period, at least one of the following parameters of supply of oxygenation gas, namely the duration of the interruption period, the duration of the period and the mass flow-rate of the oxygenation gas during the alternate supply period, is chosen in such manner that the quantity of oxygenation gas supplying the oxygenation zone per unit of time corresponds substantially to the consumption of oxygen per unit of time of the biochemical oxidation system.

The supply of oxygenation gas being carried out in a fractional manner, by quantity of oxygenation gas fed into the oxygenation zone per unit of time, there is meant the ratio between the total quantity of oxygenation gas expressed in mass units having been fed to the oxygenation zone for a previously chosen period of time, for example one or several minutes on the one hand, and on the other hand this previously chosen period of time.

The consumption of oxygen of the biochemical oxidation system per unit of time cannot be appreciated directly at the level of the biomass. However, the average consumption of oxygen by the biomass may be estimated indirectly from the average pollutant charge applied to the oxygenation zone, and in consequence from the nominal conditions chosen for the calculation and determination of the various equipments of the oxygenation zone.

Furthermore, the variations of the consumption of oxygen by the biomass may be estimated indirectly by the detection of the variations of a parameter to be adjusted, chosen in an appropriate manner.

In order to find a solution which will satisfy the second object previously defined, the following test was first of all made.

The inlet of the oxygenation zone reserved for the introduction of pre-treated waste water was closed, and the outlet of this same zone, reserved for the evacuation of the mixed liquor, was also closed, while keeping the mechanical oxygenation system in operation.

At an initial reference instant, a pre-determined quantity of the oxygenation gas was then introduced into the oxygenation zone, this quantity being introduced into the said zone in an almost instantaneous manner. There was then observed the evolution of the total pressure of the gaseous atmosphere of the biochemical oxidation system, the concentration of gaseous oxygen in this same gaseous atmosphere, and the concentration of dissolved oxygen in the liquid mass of the biochemical oxidation system.

The following conditions were then observed:

(1) After an initial reference instant, the total pressure increases over a relatively short period of time, for example of the order of 30 seconds;

(2) After this same initial reference instant, the concentration of gaseous oxygen increases in a period of time slightly longer than that preceding, for example of the order of 40 seconds;

(3) After this same initial reference instant, the concentration of dissolved oxygen increases over a relatively long period of time, for example of the order of 3 to 4 minutes.

This test then leads to the following findings:

(a) The overall transfer of a given quantity of oxygen from the source of oxygenation gas to the biomass is in fact composed of at least three elementary transfers of respectively different kinetics, namely a first transfer of the oxygenation gas from the said source to the heart of the gaseous atmosphere of the biochemical oxidation system, a second transfer of the oxygen supplied by the oxygenation gas, from the said gaseous atmosphere up to the heart of the liquid mass of the biochemical oxidation system, and a third and last transfer of the oxygen dissolved in the mixed liquor from the said liquid mass up to the interior of the living cells which constitute the biomass;

(b) The second transfer previously defined, that is to say the solution of gaseous oxygen in the mixed liquor, or conversely the de-gasification of the oxygen dissolved in the gaseous atmosphere, is a relatively slow phenomenon.

A first characteristic feature of a regulation system according to the invention consists of determining the state of the biochemical oxidation system by the detection of the whole of at least the three following parameters to be adjusted, namely respectively:

(1) The total pressure existing in at least part of the gaseous atmosphere of the biochemical oxidation system. This parameter to be regulated represents in fact the equivalency desired at the level of the first elementary transfer previously defined, that is to say of the introduction of the oxygenation gas into the heart of the gaseous atmosphere of the said system.

(2) The concentration of gaseous oxygen in at least part of the gaseous atmosphere of the biochemical oxidation system. This parameter to be regulated is in fact representative of the equivalency desired at the level of the second elementary transfer previously defined, that is to say of the solution of the gaseous oxygen in the heart of the liquid mass of the said system.

(3) The concentration of dissolved oxygen in at least one part of the liquid mass of the biochemical oxidation system. This parameter to be regulated is in fact representative of the desired equivalency at the level of the third elementary transfer previously defined, that is to say of the diffusion of the dissolved oxygen at the heart of the living matter, that is to say of the biomass.

In order to be able to check whether the desired equivalency is obtained or not, and this at one or more of the different levels of the transfer of oxygen towards the biomass, a so-called reference state is assigned to the bio-chemical oxidation system; this reference state is characterized by at least three reference values assigned respectively to the three parameters to be regulated as previously stated.

Having split-up the transfer of oxygen towards the biomass into three elementary transfers, it may be deduced that any departure of the biochemical oxidation system with reference to its state of reference results from the action of one or more disturbing magnitudes at the level of one or more of the said elementary transfers.

In consequence, the automatic regulation system chosen must act at the level of the three said elementary transfers and must automatically regulate, not just a single regulating quantity but at least three regulating quantities which permit the desired equivalency to be re-established at these three levels respectively. The three regulating quantities chosen must therefore have a determining and preponderant influence on the three elementary transfers respectively, so as to re-establish the desired equivalency at these three respective levels.

As regards the first elementary transfer, according to the present invention, the regulating quantity chosen is the quantity of oxygenation gas supplied per unit of time to the oxygenation zone.

As regards the second elementary transfer, according to the present invention, the regulating quantity chosen is either the concentration of gaseous oxygen in at least a part of the gaseous atmosphere of the biochemical oxidation system, or the mechanical power provided for the mechanical oxygenation means.

As regards the third elementary transfer, up to the present time, no regulating quantity is known which is capable of having a preponderant and determinant influence on the assimilation of the dissolved oxygen by the living cells of the biomass, and in consequence on the desired equivalency at the level of the biomass. In addition, if the efficiency of use of the oxygenation gas is taken into account, it is essential to maintain the concentration of dissolved oxygen in the mixed liquor at a relatively-low constant value permitting the evacuation of the oxygenation zone and giving the minimum loss of oxygen in the dissolved state.

When once the concentration of dissolved oxygen is fixed, it is no longer possible to modify this physical quantity and to utilize it as a regulating quantity for the third and last oxygen transfer. In consequence, at the level of the third elementary transfer, according to the present invention, no particular regulating quantity is chosen.

A second characteristic feature of a system of regulation according to the invention thus consists of acting on the biochemical oxidation system so as to maintain it in its reference state and to keep each of the three chosen parameters to be regulated at a reference value, corresponding to the reference state as previously defined.

This is obtained by automatically regulating the whole of at least the two following regulating quantities, namely, in the first place either of the two following quantities, that is to say the concentration of gaseous oxygen in at least part of the gaseous atmosphere of the biochemical oxidation system and the mechanical power allocated to the mechanical oxygenation means, and in the second place the quantity of oxygenation gas supplied to the oxygenation zone per unit of time.

Finally, the adjustment of the first regulating quantity chosen, namely either of the concentration of gaseous oxygen in at least part of the gaseous atmosphere of the biochemical oxidation system, or of the mechanical power given to the mechanical oxygenation means, applies an action, not only at the level of the second elementary transfer above-defined, but also at the level of the third and last transfer previously specified, located downstream of the second transfer in the direction of transfer of oxygen towards the biomass.

Thus, according to the invention, it is necessary to adjust automatically the first regulating quantity as a function of at least the following factor, i.e. the difference between the detected value of the third parameter to be regulated and a reference value of this latter. This constitutes a third characteristic feature of a regulation system according to the invention.

If the methods of operation permitting the achievement of the first object of the present invention are merged and combined with the methods of regulation permitting the second object of the invention to be attained, there results a method of oxygenation which makes it possible to obtain an excellent efficiency of use of the oxygenation gas, at least equal to 95%, fully attaining the objective which was fixed at the beginning of the present description.

In addition to the general characteristics previously defined, this method of oxygenation further presents the following special features:

(1) The second regulating quantity of the automatic regulation system corresponds to the oxygenation gas feeding the oxygenation zone in a fractional manner.

(2) The automatic adjustment of the second regulating quantity consists of adjusting automatically at least one of the following parameters of supply of oxygenation gas, namely:

the duration of the alternate period of supply of oxygenation gas. This must however remain at most equal to the average duration of the travel of the bubbles of oxygenation gas;

the period of the interruption of supply of oxygenation gas;

the duration of the period of supply of oxygenation gas from the oxygenation zone;

the mass flow-rate of the oxygenation gas during the said alternate supply period.

The present invention will now be described by way of example, reference being made to the accompanying diagrammatic drawings, in which:

FIG. 2a is a diagram of the mass flow-rate $q$ of the oxygenation gas (in ordinates) as a function of the time in abscissae;

FIG. 2b is a diagram of the flow-rate of oxygen transferred from the gaseous atmosphere to the mass of liquid as a function of the time in abscissae;

FIG. 2c is a double diagram showing in full lines the concentration of dissolved oxygen in the liquid mass as a function of time, and on the other hand in broken lines, the concentration of gaseous oxygen in the gaseous atmosphere as a function of time;

FIG. 2d is a double diagram showing on the one hand in full lines the concentration of carbon dioxide dissolved in the liquid mass as a function of time, and on the other hand in broken lines the concentration of nitrogen dissolved in the liquid mass as a function of time;

Figure 3:
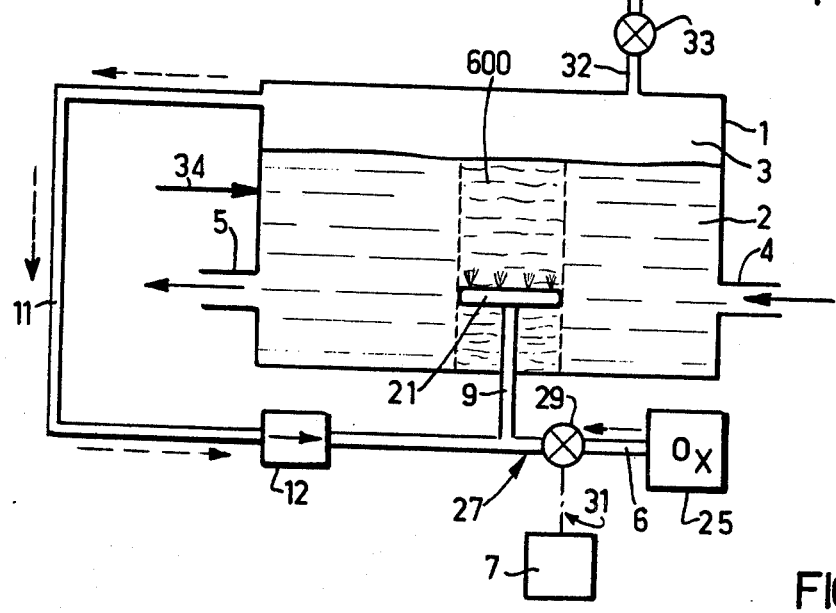
Figure 4:
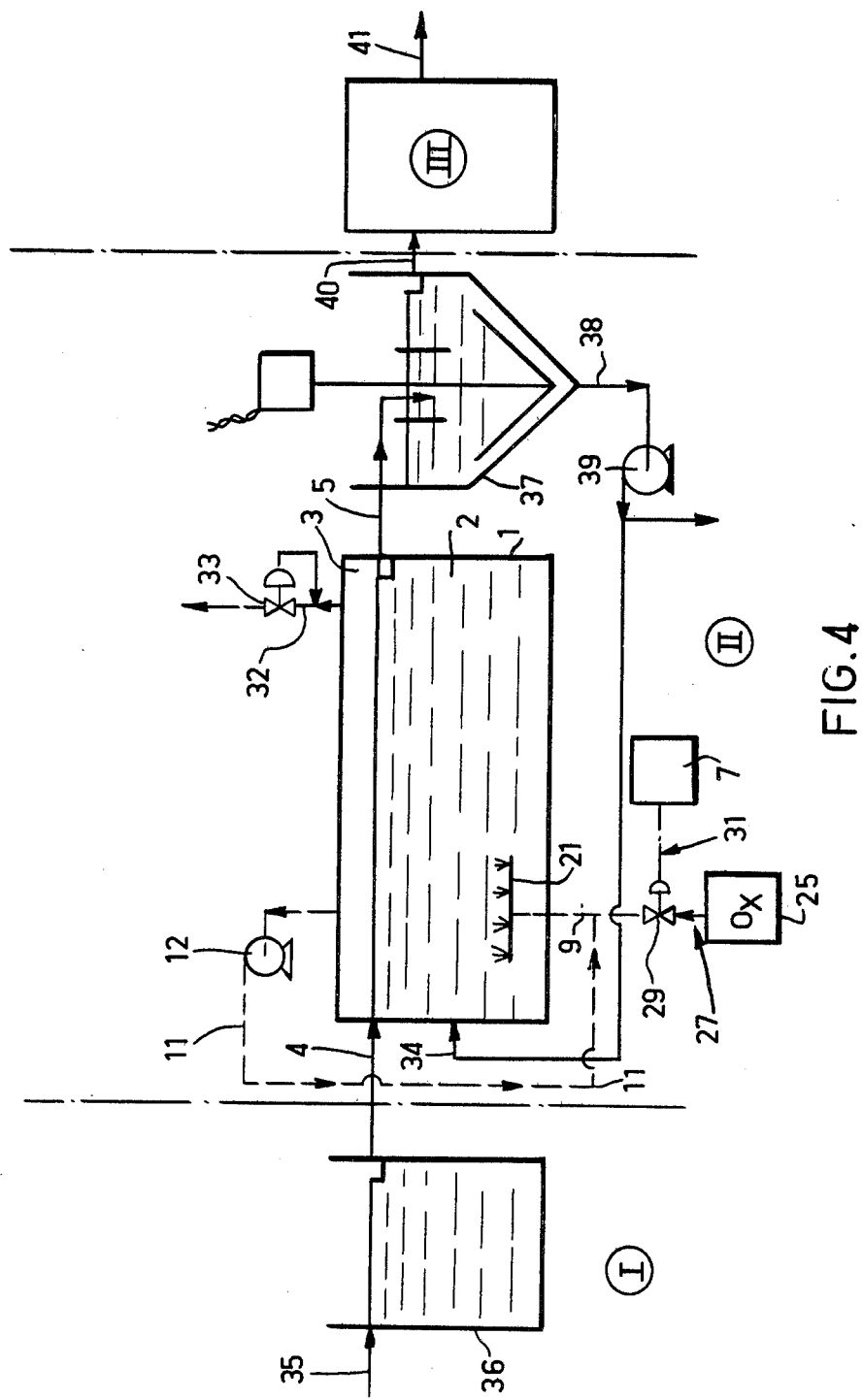
Figure 5:
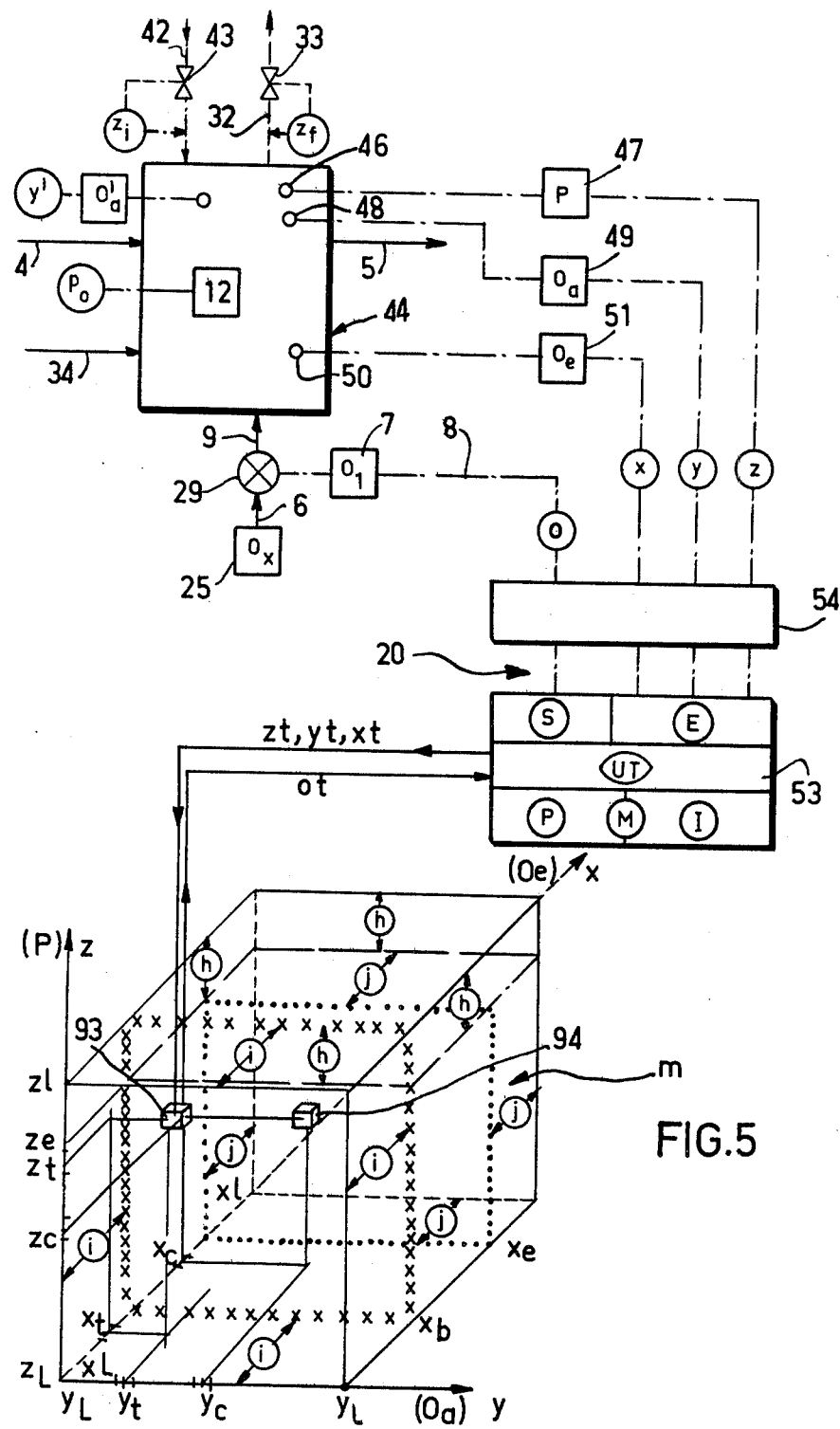
Figure 6:
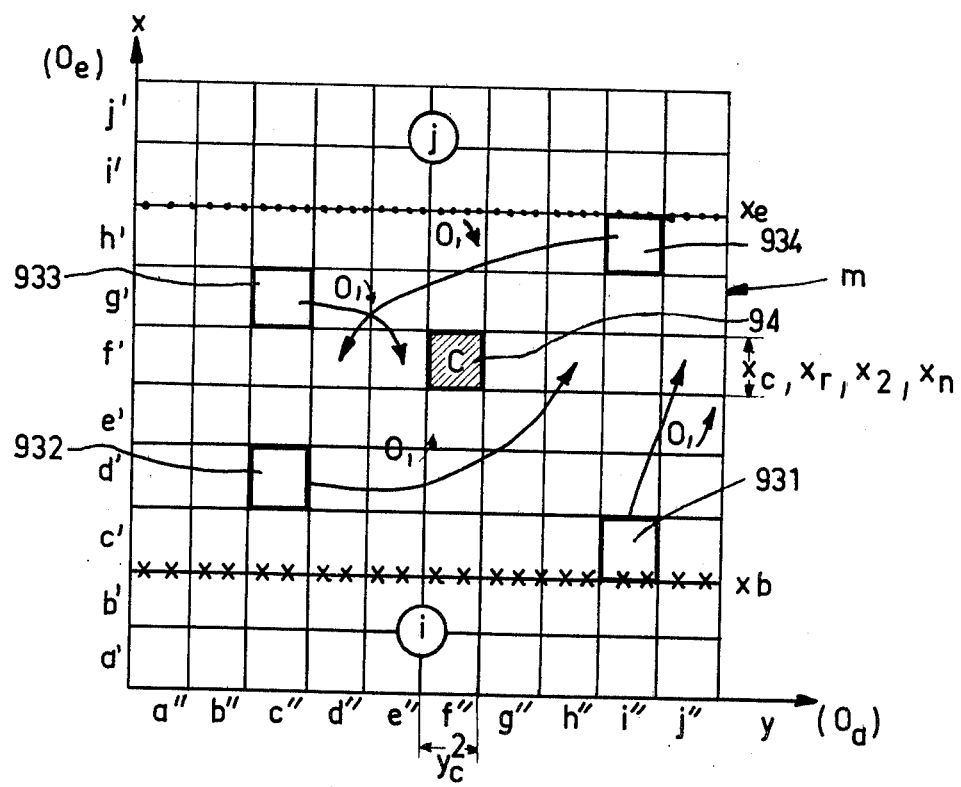
Figure 7:
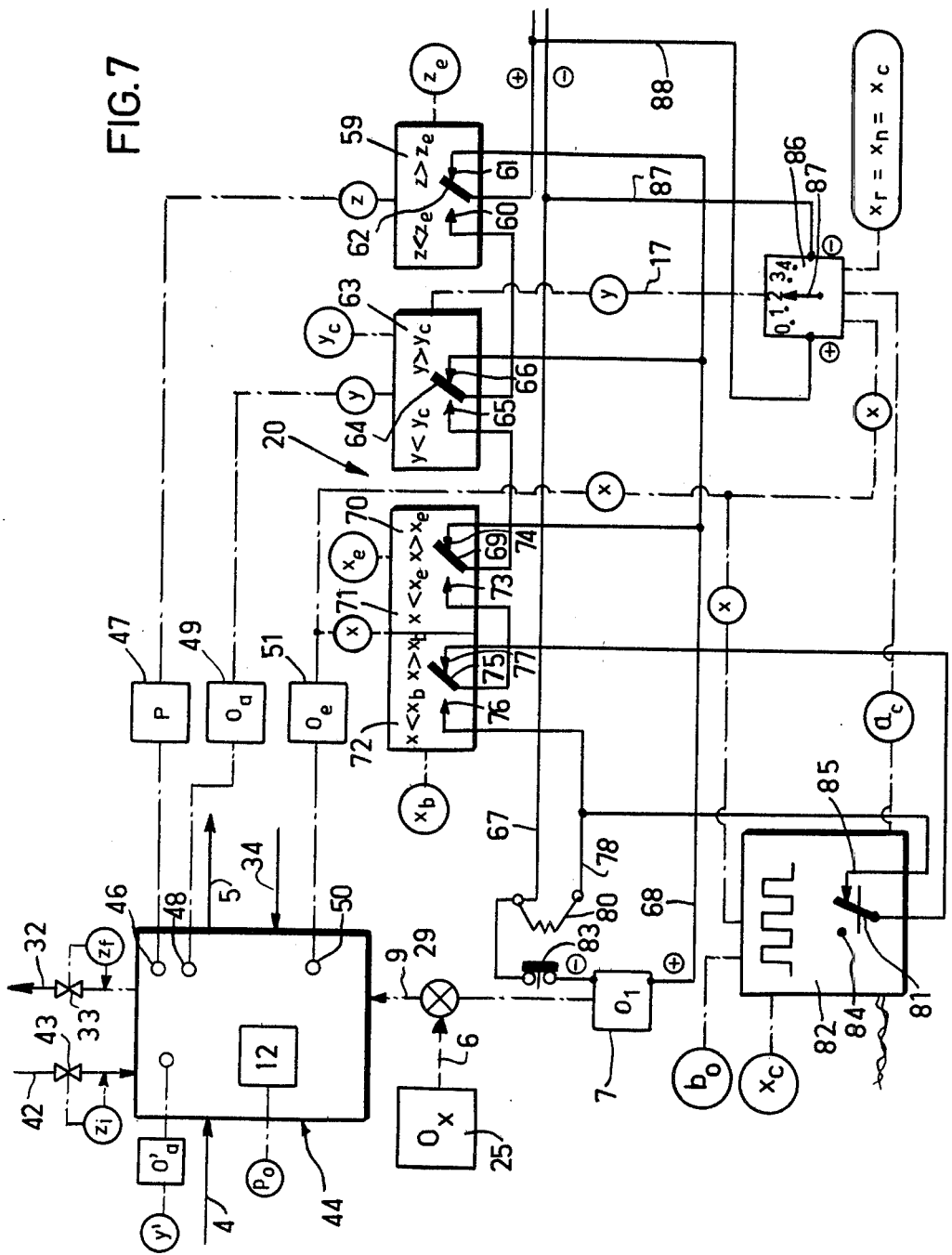
Figure 8:
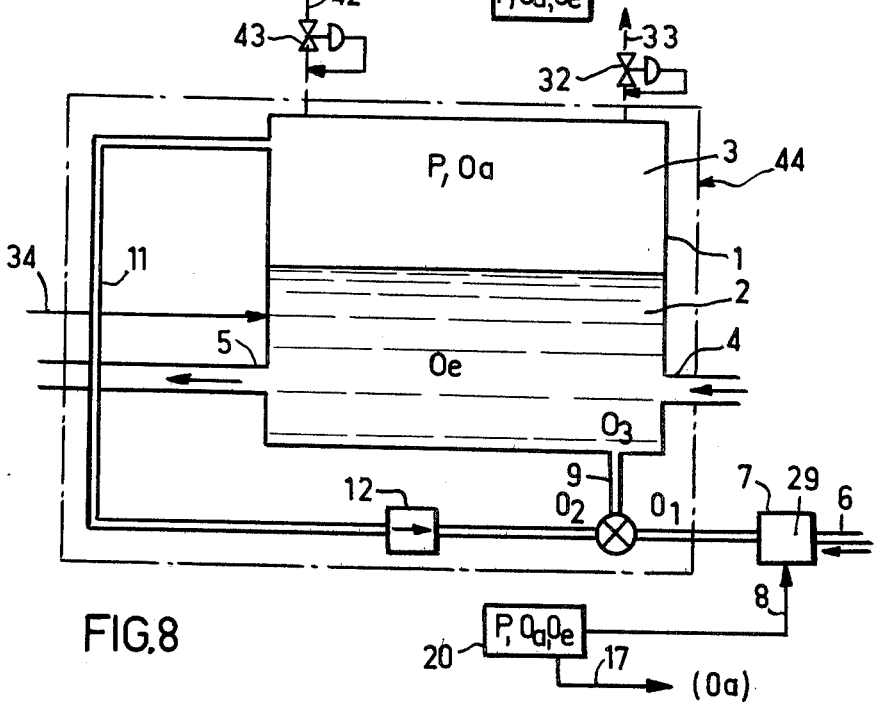
Figure 9A:
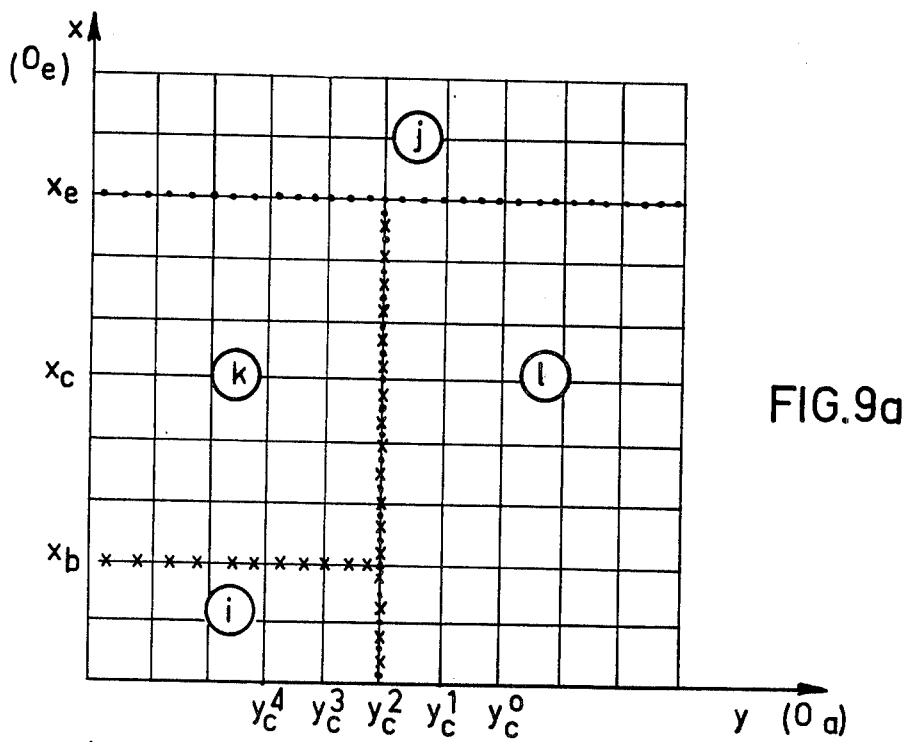
Figure 9B:
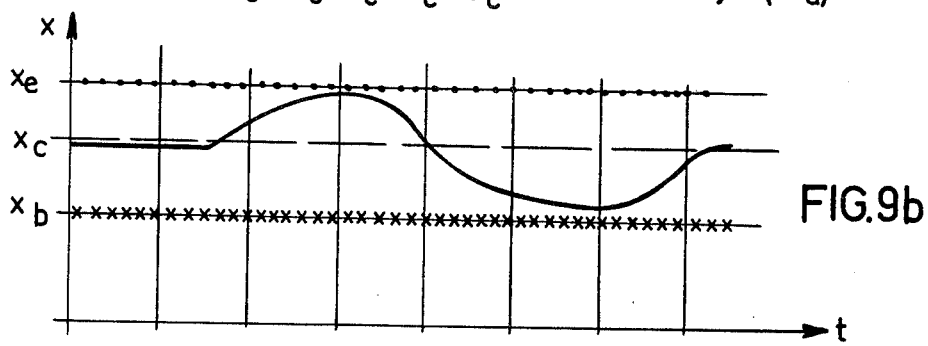
Figure 9C:
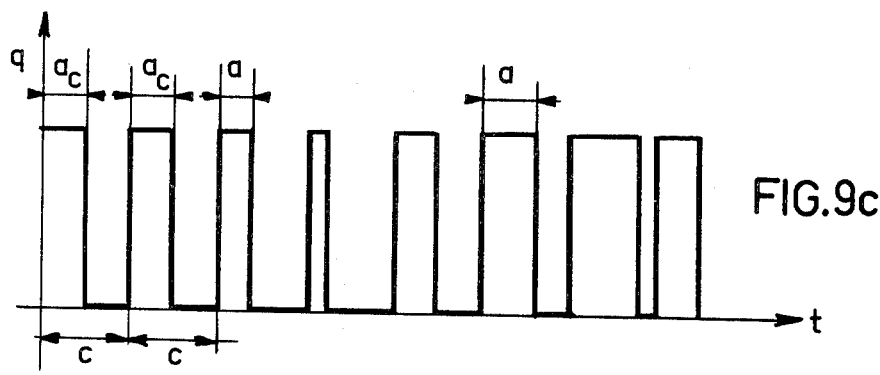

FIG. 2e is a triple diagram showing first in full lines the concentration of gaseous nitrogen in the gaseous atmosphere as a function of time, and secondly, in broken lines, the concentration of carbon dioxide in the gaseous atmosphere as a function of time, and thirdly in chain-dotted lines, the total pressure in the gaseous atmosphere as a function of time. It should be indicated that the time scale is the same in FIG. 2a as in FIG. 2e;

FIG. 3 is a diagrammatic view of another oxygenation device;

FIG. 4 is a diagrammatic view of an installation for the treatment of waste water;

FIG. 5 is a diagrammatic view of an oxygenation device equipped with a regulation system by programmed logic (micro-processor);

FIG. 6 is an operation diagram of the regulation system shown in FIG. 5;

FIG. 7 is a diagrammatic view of an oxygenation device equipped with another regulation system with cabled logic;

FIG. 8 is a more precise diagrammatic view of the oxygenation device shown in FIG. 7;

FIG. 9a represents various conditions of operation according to the concentration of gaseous oxygen (abscissae) of the gaseous atmosphere and the concentration in dissolved oxygen (ordinates) of the liquid mass;

FIG. 9b represents the concentration in dissolved oxygen as a function of the time;

FIG. 9c represents the mass flow-rate of the oxygenation gas as a function of the time; it will be noted that the time scale of FIG. 9b is identical with that of FIG. 8c.

Figure 1:
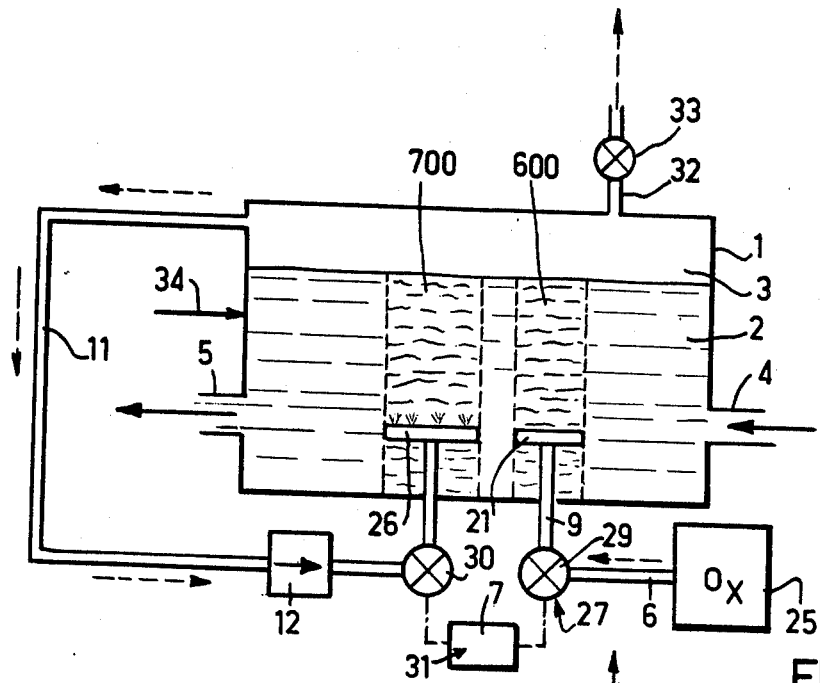
FIG. 1 is a diagrammatic view of an oxygenation device.
Figure 11:
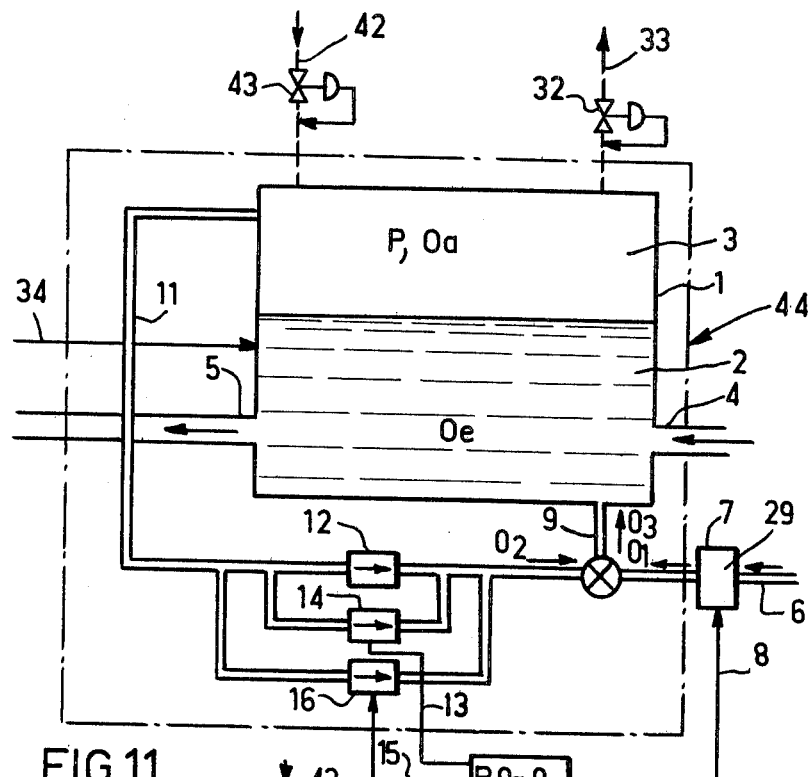
Figure 10:
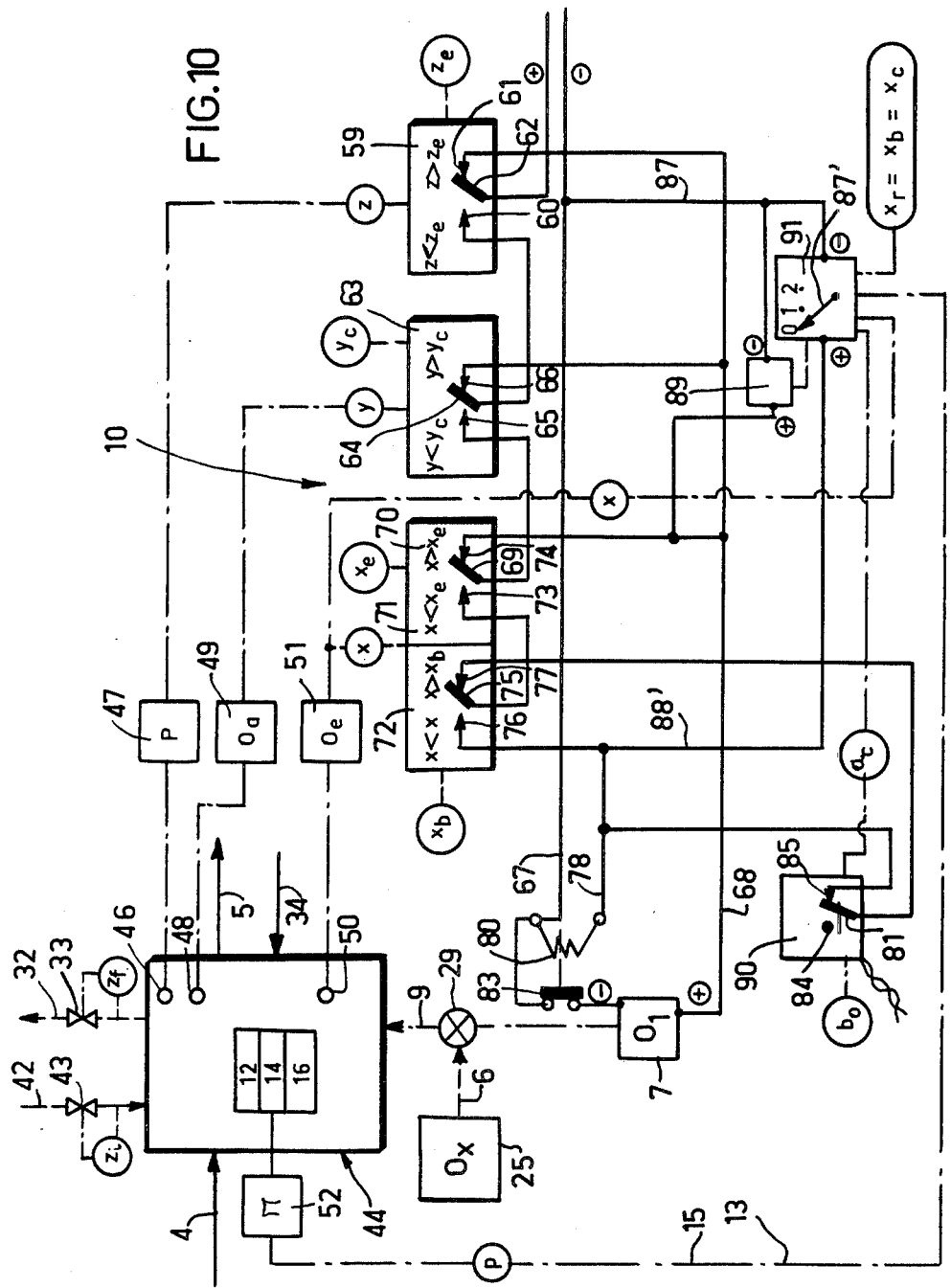
Figure 13:
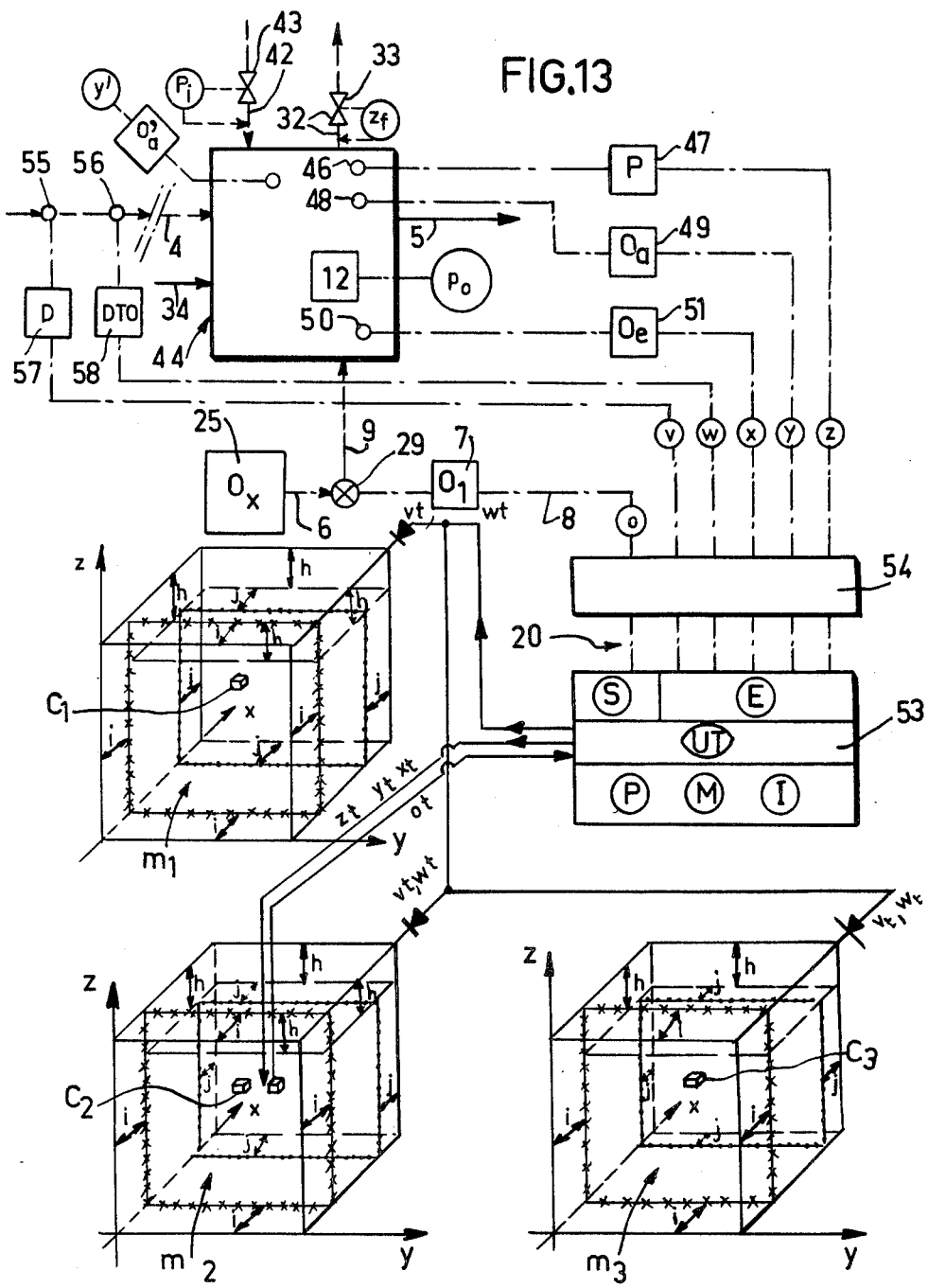
Figure 14:
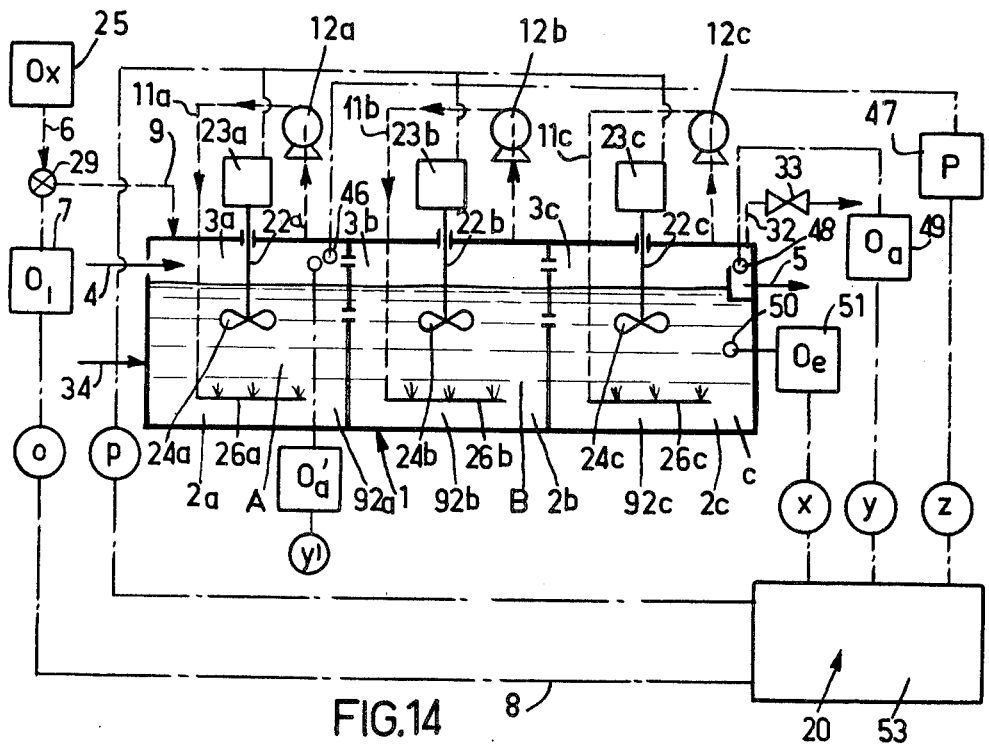
Figure 15:
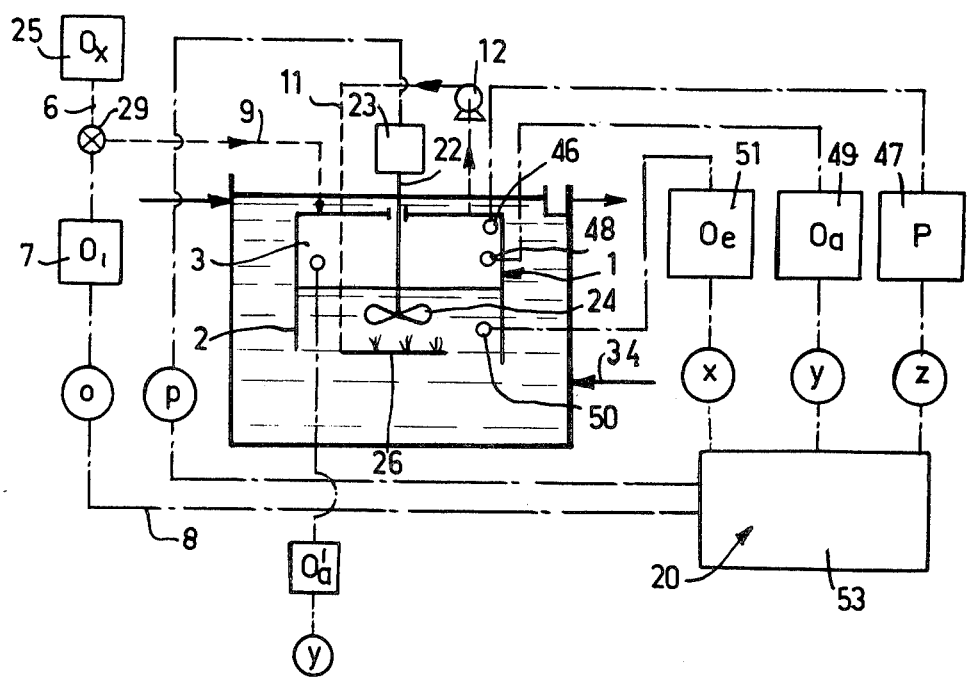

FIG. 10 is a diagrammatic view of an oxygenation device equipped with another regulation system with cabled logic;

FIG. 11 is a more precise diagrammatic view of the oxygenation device shown in FIG. 10;

FIG. 12a represents various conditions of operation according to the concentration of gaseous oxygen (abscissae) in the gaseous atmosphere, and the concentration of dissolved oxygen (ordinates) in the liquid mass of the biochemical oxidation system shown in FIG. 10;

FIG. 12b represents the concentration of dissolved oxygen (ordinates) as a function of time (abscissae);

FIG. 12c shows on the one hand in broken lines the mass flow-rate (ordinates) of the oxygenation gas as a function of time (abscissae), and on the other hand, in full lines, the working times of the compressors shown in FIG. 10 and 11;

FIG. 12d represents the electrical energy consumed (ordinates) by the above compressors as a function of the time (abscissae);

FIG. 13 is a diagrammatic view of an oxygenation device equipped with another regulation system with programmed logic;

FIG. 14 is a diagrammatic view of an oxygenation device of the continuous multi-stage type;

FIG. 15 shows in a diagrammatic manner an oxygenation device of the non-continuous single-stage type;

With reference to FIG. 1, an oxygenation device comprises an oxygenation chamber or zone 1 substantially insulated from the ambient air, intended to contain a biochemical oxidation system comprising on the one hand a liquid mass 2 to be treated and a gaseous atmosphere 3 comprising oxygen, a mechanical oxygenation means comprising a compressor 12 adapted to suck-in through a conduit 11 the gaseous atmosphere 3 at the upper portion of the oxygenation zone 1 which it delivers into a diffuser 26 at the lower portion of the oxygenation zone or chamber 1 into the liquid mass 2 of the biochemical oxidation system, a supply means 27 for feeding in an oxygenation gas comprising at least 50% by volume of oxygen, intended to supply the oxygen required for the biochemical oxidation.

At the lower part of the oxygenation zone 1 is arranged an introduction conduit 4 and an evacuation conduit permitting continuous evacuation of a treated flow of mixed liquor, together with a conduit 34 permitting the introduction into the oxygenation zone 1 of at least part of the biomass necessary for biochemical oxidation.

As regards the supply means 27 of oxygenation gas, an introduction device 21 or oxygenation gas diffuser, is arranged at the lower portion of the oxygenation chamber 1, and for that purpose it is connected to a source 25 of oxygenation gas by a supply conduit 9.

There is further provided an isolating means 31 comprising a valve 29 mounted on the introduction conduit 9, a valve 30 arranged between the delivery of the compressor 12 and the diffuser 26, and operating means for the valves 29 and 30 identical with the fractional means controlling the supply of oxygenation gas so as to make it possible successively in a first time to open the valve 29 and close the valve 30, and at a second time to close the valve 29 and open the valve 30, and so on.

The oxygenation zone 1 comprises an evacuation conduit 32 with a valve 33 permitting the zone 1 to be evacuated of any possible blow-out gas, in a continuous or non-continuous manner.

The operation is as follows:

In the oxygenation zone 1 there is established a biochemical oxidation system comprising on the one hand the liquid mass 2 to be treated from the above-mentioned mixture, and on the other hand, the gaseous atmosphere 3 comprising oxygen, and in at least one portion if not the whole of the oxygenation zone 1, by virtue of the mechanical oxygenation means 12, there is circulated one of the constituents of the biochemical oxidation system previously specified, namely the part of the liquid mass 2 and the part of the gaseous atmosphere 3, each limited by the said portion or the said whole of the oxygenation zone 1 in contact with the other, and in fact the gaseous atmosphere 3 is caused to circulate in contact with the liquid mass 2.

By means of the supply device 27, the oxygenation zone 1 is fed with the oxygenation gas comprising at least 50% by volume of oxygen so as to supply the oxygen necessary for the biochemical oxidation in course in the zone 1.

Through the introduction conduit 4 there is continuously introduced into the oxygenation zone 1 a flow to be treated of the pre-treated waste water, thus comprising water and the polluting bio-degradable material; through the evacuation conduit 5 there is continuously evacuated from the oxygenation zone 1 a treated flow of mixed liquor, in consequence a treated flow comprising water, at least part of the activated sludge (biomass) present in the oxygenation zone 1, and possibly a residual portion, not oxidised by chemical process, of the bio-degradable polluting material.

Through the conduit 34, there is introduced into the oxygenation zone 1 at least a part of the activated sludge necessary for the biochemical oxidation, derived from decantation of the mixed liquor, which is thus re-cycled from the separation of clarified water/activated sludge.

Through the evacuation conduit 32 there is evacuated continuously or discontinuously from the oxygenation zone 1 towards the ambient air, at least part of the gaseous atmosphere 3 present in the oxygenation zone.

Reference will now be made to FIGS. 1 and 2a, in which by virtue of the introduction device 21, the supply of the oxygenation zone 1 with the oxygenation gas is effected in a gaseous upward circulation limited zone 600 corresponding roughly to the vertical column of liquid, the vertical generator lines of which pass through the contour of the diffuser 21 and this zone 600 may be limited physically by a vertical tube open at its lower and upper parts. By virtue of the isolation means 31, when the oxygenation gas is fed into the oxygenation zone 1, it is the only gas introduced into the liquid mass 2.

The supply of the oxygenation zone 1 with oxygenation gas is effected in a fractional manner, that is to say it comprises a succession of periods c, each comprising an alternate period of supply of oxygenation gas a followed by an alternate interruption of supply b of oxygenation gas.

The duration of the alternate period $a$ is at most equal to the average duration $d$ of travel of the bubbles of oxygenation gas from the diffuser 21 up to the interface between the gaseous atmosphere 3 and the liquid mass 2. Furthermore, for a given duration of the alternate period $a$, at least one of the following parameters, namely the duration $b$ of the alternate interruption period, the duration $c$ of the supply period and the mass flow-rate $q$ of the oxygenation gas during the alternate period $a$ is chosen in such manner that the mean rate of flow of the oxygenation gas supplying the oxygenation zone 1 corresponds substantially to the consumption of oxygen per unit of time by the biochemical oxidation system.

It is assumed that the following operational conditions remain constant during the course of the oxygenation of the mixed liquor:

The power of the mechanical means 12;

the flow-rate of the flow of pre-treated waste water to be treated, introduced through the introduction conduit 4 and the rate of flow treated of mixed liquor evacuated through the conduit 5, which furthermore remain equal to each other;

the initial DBO of the said flow to be treated and the final DBO of the said flow treated remain constant;

the oxygenation gas coming from the source 25 is substantially pure oxygen, the purity and the mass flow-rate $q$ of which remain constant during the alternate supply period $a$ and during the course of the successive periods.

Under these conditions, the fractional supply of oxygenation gas comprises several successive periods $c$ of constant duration. All these periods comprise an alternate period of supply of oxygenation gas $a$ of constant duration, followed by an alternate supply interruption $b$ of oxygenation gas having a constant duration. By way of example, the average duration $d$ is of the order of 15 to 20 seconds for a height of liquid of the order of 3.50 m.

The operation of the oxygenation zone 1 is then as follows:

During the alternate supply period $a$, the valve 9 is open and the valve 30 is closed; the oxygenation gas coming from the source 25 is the only gas introduced into the heart of the liquid mass 2 of bio-chemical oxidation system.

Then, during the alternate supply interruption $b$, the valve 9 is closed and the valve 30 is open, so that the gaseous atmosphere 3 of the biochemical oxidation system is introduced into the heart of the liquid mass 2 of this latter by virtue of the gaseous circulation means 12 and the introduction means 26. The gaseous atmosphere coming from the upper part of the zone 1 is then the only gas introduced into the heart of the liquid mass 2 of the biochemical oxidation system.

The cycle thus subsequently repeats itself.

During the alternate period $a$, the following conditions are thus checked:

No bubble of oxygenation gas has yet reached the interface between the gaseous atmosphere 3 and the liquid mass 2. In consequence, no bubble of oxygenation gas has yet come to be mixed in the heart of the gaseous atmosphere 3;

the gaseous atmosphere 3 is not re-cycled to the centre of the liquid mass 2.

The alternate period $b$ can be divided into three sub-periods having respectively a duration $e$ equal to the duration $d$ reduced by the duration $a$, a duration $f$, equal to the duration $a$, and a duration $g$ equal to the duration $b$ reduced by the durations $e$ and $f$.

During the sub-period $e$, the following conditions are checked:

No bubble of oxygenation gas has yet become mixed at the centre of the gaseous atmosphere 3;

the gaseous atmosphere 3 is re-cycled at the heart of the liquid mass 2.

During the sub-period $f$, the following conditions are verified:

The bubbles of oxygenation gas emitted during the supply period $a$ from the introduction point 21, become mixed at the centre of the gaseous atmosphere 3;

the gaseous atmosphere 3 continues to be re-cycled to the heart of the liquid mass 2.

During the sub-period $g$, the following conditions are checked:

no further bubble of oxygenation gas becomes mixed at the centre of the gaseous atmosphere 3;

the gaseous atmosphere 3 continues to be re-cycled to the heart of the liquid mass 2.

At the beginning of the first alternate period $a$, it is assumed that the effective oxygenation capacity of the bio-chemical oxidation system present in the oxygenation zone 1 has become relatively small. The introduction of the oxygenation gas by means of the device 21 has in fact especially for its object to improve this effective oxygenation capacity. In consequence, at the beginning of the alternate period $a$, it is assumed that the bio-chemical oxidation system is placed under the following conditions:

The gaseous atmosphere 3 has the following initial characteristics:

The concentration of gaseous oxygen is the greatest, and is for example of the order of 50%; it is however relatively small with respect to the effective oxygenation capacity desired;

the concentration of nitrogen is for example of the order of 40%, and is thus relatively high with respect to the effective oxygenation capacity desired;

the concentration of carbon dioxide is the least important, taking account of the great solubility of this gas in water and is for example of the order of 10% it is however relatively high with respect to the effective oxygenation capacity desired;

the liquid mass 2 has the following initial characteristics

The initial concentration of dissolved carbon dioxide is the greatest, and is for example of the order of 175 mg. per litre; it is relatively large, taking account of the re-dissolving of carbon dioxide during the alternate period $b$, as described below;

the initial concentration of dissolved oxygen is the second in order of importance, and is for example of the order of 22.3 mg. per liter; it is relatively small in view of the continuous consumption of oxygen of the biomasse the concentration of dissolved nitrogen is the least important, and is for example of the order of 7.7 mg. per liter; it is relatively large when account is taken of the re-dissolving of nitrogen during the alternate period $b$, as described below.

During the first alternate period $a$, two gas-liquid interfaces are developed in the biochemical oxidation system, namely a first horizontal interface between the liquid mass 2 and the gaseous atmosphere 3, and a second interface between the liquid mass 2 and the bubbles of oxygenation gas in course of upward movement towards the first interface. Correlatively, two oxygen-dissolving stages occur simultaneously, along the first and second interfaces respectively.

The partial specific transfer corresonding to the first dissolving stage at the beginning of the alternate period $a$ is relatively small, because the first initial concentration of saturation of dissolved oxygen in the liquid mass 2, corresponding to the intial concentration of gaseous oxygen in the gaseous atmosphere 3 (this latter is not modified during the alternate period $a$), is initially very slightly higher than the initial concentration of dissolved oxygen in the liquid mass 2.

During the alternate period $a$, the specific transfer corresponding to the first dissolving stage decreases relatively little from its initial value, since the concentration of dissolved oxygen becomes very close to the first initial concentration of saturation in dissolved oxygen (this concentration is not modified during the alternate period $a$,) and becomes very rapidly zero, since the concentration of dissolved oxygen becomes very rapidly equal and then greater than the first initial saturation concentrate of dissolved oxygen.

The partial specific transfer corresponding to the second dissolving stage at the beginning of the alternate period $a$ is relatively high, because the second initial saturation concentration of dissolved oxygen in the liquid mass 2, corresponding to the initial concentration of gaseous oxygen in the bubbles of oxygenation gas (this concentration is modified during the upward movement of the gaseous bubbles) is initially very considerably greater than the initial concentration of dissolved oxygen in the liquid mass 2.

During the alternate period $a$, the specific transfer corresponding to the second dissolving stage decreases relatively greatly from its initial value, while remaining very much greater than the specific transfer of the first dissolving stage at the beginning of the period $a$, and then relatively high, since the concentration of dissolved oxygen remains during the whole alternate period $a$ very far from the second saturation concentration of dissolved oxygen (this concentration is modified during the course of the upward movement of the oxygenation gas).

To sum up, during the alternate period $a$, the specific transfer of the first dissolving the stage may first of all be neglected with respect to the specific transfer of the second dissolving stage, and is subsequently nil. In consequence, during the alternate period $a$, the overall specific transfer of oxygen is practically identical to the partial specific transfer of the second dissolving stage.

During all the alternate period $a$, but also during the sub-periods $e$ and $f$, the composition of the bubbles of gas becomes modified during the course of their upward movement towards the first interface and there exists in fact a mass transfer taking place in both directions along the second interface.

When the bubbles of gas reach the first interface:

A part of the initial oxygen contained in the oxygenation gas has been transferred from the bubbles of gas to the liquid mass 2;

Part of the carbon dioxide and the nitrogen contained in the liquid mass 2 has been transferred from this latter to the bubbles of gas.

In addition, when the bubbles of gas reach the first interface, the gas which then becomes mixed with the gaseous atmosphere 3 has the following characteristics:

the concentration of gaseous oxygen is the greatest, and is for example of the order of 85%; it is however relatively low with respect to the intial concentration of gaseous oxygen in the oxygenation gas which supplies the oxygenation zone;

the concentration of gaseous nitrogen is the second in order of importance, and is for example of the order of 12% it is however relatively large in view of the fact that the oxygenation gas contains practically no nitrogen;

the concentration of carbon dioxide is the lowest, and is for example of the order of 3%; it is however relatively large in view of the fact that the oxygenation gas does not contain any carbon dioxide.

In consequence, during the first alternate period $a$:

the concentration of dissolved oxygen in the liquid mass 2 increases considerably from its relatively-low initial value;

the concentration of gaseous oxygen in the gaseous atmosphere decreases only very slightly from its relatively-low initial value, taking account of the very small quantity of the corresponding partial specific transfer to the first dissolving stage, and then rapidly becomes substantially constant, taking into account the zero value of the specific transfer of the first dissolving stage, and taking into account the small increase (by biological process) of the concentration of carbon dioxide in the gaseous atmosphere 3 during the alternate period $a$; thus it may be considered that the concentration of gaseous oxygen remains substantially constant during the first alternate period $a$;

the concentrations of dissolved carbon dioxide and dissolved nitrogen in the liquid mass 2 vary differently from their respective initial values in the inverse sense of the concentration of dissolved oxygen; the first diminishes in a damped manner, taking account of the biological production of carbon dioxide, compensating the degassing of this latter, and the second diminishes abruptly;

the concentration of gaseous nitrogen in the gaseous atmosphere 3 remains substantially constant and equal to its initial value;

the concentration of carbon dioxide in the gaseous atmosphere 3 increases relatively little, and this increase does not correspond to a displacement of the carbon dioxide by oxygen, but to the metabolism of the biomass;

on the other hand, the introduction of a certain quantity of the oxygenation gas during the alternate period $a$ increases the total pressure in the oxygenation zone due to a corresponding reduction of the free volume of the gaseous atmosphere 3.

The operating conditions of the sub-period $e$ only differ from those of the alternate period $a$ by the fact that the first interface is increased by a third gas/liquid interface between the liquid mass 2 and the bubbles of the re-cycled gaseous atmosphere 3, in course of upward movement towards the first interface in the other upward gaseous circulation zone 700. However, for the same reasons as those evoked in connection with the first oxygen-dissolving stage and the first interface, the partial specific transfer of oxygen across the third interface is nil. In consequence, during the first sub-period $e$, the overall specific transfer of oxygen is almost identical to the partial specific transfer along the second interface. As regards the oxygen, during the sub-period $e$, the same conditions are again found as those obtaining during the course of the alternate period $a$, which means that:

the specific transfer of oxygen continues to decrease but now relatively little. It remains however relatively high;

the concentration of dissolved oxygen in the liquid mass 2 continues to increase, but now relatively more slowly.

Overall, during the sub-period *e*, the concentration of gaseous oxygen in the atmosphere 3 remains practically constant, in view of the fact that, for the same reasons as those previously advanced, the concentration of carbon dioxide in the atmosphere 3 continues to increase slightly.

As regards the carbon dioxide and nitrogen dissolve during the sub-period *e*, the introduction of the bubbles of re-cycled gaseous atmosphere 3 into the liquid mass 2 only attenuates the results obtained during the alternate period *a*. Correlatively, during the sub-period *e*:

the concentrations of dissolved carbon dioxide and dissolve nitrogen in the liquid mass 2 decrease relatively more slowly;

the concentration of carbon dioxide in the gaseous atmosphere 3 continues to increase relatively slowly, and the concentration of gaseous nitrogen remains substantially constant;

the total pressure in the oxygenation zone remains substantially constant and equal to its maximum value, reached during the alternate period *a*.

As regards the carbon dioxide and the nitrogen, approximately at the end of the sub-period *e*, the following conditions are verified:

the concentrations of dissolved carbon dioxide and dissolved nitrogen have become relatively low in view of the degassification effected during the alternate period *a* and the sub-period *e*, due to the effect of the passage of the oxygenation gas into the liquid mass 2;

the saturation concentrations of dissolved carbon dioxide and dissolved nitrogen in the liquid mass 2, corresponding to the concentrations of carbon dioxide and gaseous nitrogen respectively in the gaseous atmosphere 3 are then much higher than the concentrations of dissolved carbon dioxide and dissolved nitrogen respectively of the liquid mass 2; these saturation concentrations have not in fact been substantially modified during the alternate period *a* and the sub-period.

Under these conditions, from the beginning of the sub-period *f*, the conditions of re-dissolving of the carbon dioxide and the nitrogen become combined, first for the carbon dioxide (approximately at the beginning of the sub-period *f*), taking account of the fact that the biological production of carbon dioxide gas is added to the physical transfer of this gas to the gaseous atmosphere 3, and in consequence accelerates the enrichment in carbon dioxide of this latter, then for the gaseous nitrogen (approximately at the end of the sub-period *f*), taking into account the slower enrichment of the atmosphere 3 in gaseous nitrogen. At the end of the sub-period *f*, the physical conditions necessary for a re-dissolving stage are established both for the gaseous nitrogen and the carbonic acid gas.

During the sub-period *f*, the second dissolving face gradually disappears on the one hand, and on the other hand the bubbles of oxygenation gas, the gaseous composition of which has been modified during their upward movement in the liquid mass 2, become gradually mixed in the centre of the gaseous atmosphere 3. During the sub-period *f*, the first and third interfaces previously defined, still remain.

In consequence, during the sub-period *f*, the gaseous atmosphere 3 changes towards a new final composition:

in which the concentration of gaseous oxygen is relatively greater than the initial value observed at the beginning of the alternate period *a*;

in which the concentrations of carbonic acid gas and gaseous nitrogen are relatively lower than the initial values respectively observed at the beginning of the alternate period *a*.

During the sub-period *f*, the partial specific transfer of oxygen across the first and third interfaces gradually diminishes for the following reasons:

the saturation concentration of dissolved oxygen in the liquid mass 3 corresponding to the concentration of gaseous oxygen in the gaseous atmosphere 3 increases very rapidly to a maximum value during the course of the sub-period *f*; as and when the concentration of gaseous oxygen referred to also increases very rapidly to a maximum value, from the beginning of the sub-period *f*, this saturation concentration exceeds the concentration of dissolved oxygen in the liquid mass 2, and the transfer of oxygen across the first and third interfaces starts again immediately;

then, during the remainder of the sub-period *f*, after the saturation concentration has reached its maximum, the concentration of dissolved oxygen approaches this latter, so that the partial specific transfer across the interfaces in question becomes gradually reduced.

During the sub-period *f*, the specific transfer of oxygen across the second interface gradually becomes nil, since this interface gradually disappears On the whole, during the sub-period *f*, the overall specific transfer of oxygen continues to diminish gradually, for reasons different from those explained for the periods *a* and *e*. At the end of the sub-period *f*, the concentration of dissolved oxygen reaches a maximum value.

As regards the carbon dioxide and the nitrogen, the preceding observations, concerning the re-dissolving of the carbon dioxide and the gaseous nitrogen lead to the following observations during the sub-period *f*:

the concentration of dissolved carbonic acid gas in the liquid mass 2 again begins to increase but relatively slight;

the concentration of nitrogen dissolved in the liquid mass continues to diminish due to the transfer along the second interface, and this diminution is now very slow;

the concentrations of carbonic acid gas and gaseous nitrogen in the gaseous atmosphere 3 decrease in a damped manner for the carbonic acid gas, due to a dilution effect, and in a more abrupt manner for the gaseous nitrogen;

During the period *g*, the concentration of dissolved oxygen in the liquid mass 2 falls from its maximum by the effect of the biological consumption of oxygen. In consequence, the concentration of dissolved oxygen again departing by a fault from the maximum saturation concentration of dissolved oxygen defined by sub-period *f*, the specific transfer of oxygen continues along the first and third interfaces. The transfer continues to diminish with a decrease substantially different from that observed during the periods *a*, *e* and *f*, since the reduction now results from an impoverishment of gaseous oxygen in the gaseous atmosphere 3, coinciding with a reduction of the concentration of dissolved oxygen.

In consequence, during the sub-period *g*, the concentration of dissolved oxygen in the liquid mass 2 decreases and the concentration of gaseous oxygen in the gaseous atmosphere 3 decreases in a damped manner.

As regards the carbonic acid gas and the nitrogen, for the same reasons as were explained in connection with the sub-period $f$, there is observed during the sub-period $g$, a definite re-dissolving stage of these gases. In consequence, during the sub-period $g$:

the concentration of dissolved carbonic acid gas in the liquid mass 2 continues to increase, but now to a considerable relative extent, and the concentration of dissolved nitrogen now increases with a corresponding break in the slope at the maxima of the concentrations of gaseous oxygen and dissolved oxygen;

the concentrations of carbonic acid gas and gaseous nitrogen in the gaseous atmosphere 3 increase slightly, taking account of the biological activity of the biomass and of the corresponding displacement of the nitrogen by oxygen transferred for biological reasons;

the total pressure continues to decrease more and more slowly.

Referring now to FIGS. 2a to 2e, it is thus found that the operative methods which characterize the present invention make it possible to effect successively an exhaustion of carbonic acid gas and nitrogen from the mixed liquor, at least during the alternate supply period $a$, and a re-dissolving action in the mixed liquor of the degassified carbon dioxide and nitrogen during at least the interruption period $b$ of supply of oxygenation gas (Cf FIG. 2d).

Correlatively, during the alternate period $b$, the carbon dioxide and the nitrogen are eliminated from the oxygenation zone 1 in the dissolved form with the treated flow of mixed liquor, evacuated from the zone 1 by the evacuation conduit 5. On the whole, during the course of oxygenation, the quantity of the blow-out gas evacuated from the zone 1 through the conduit 32 and the valve 33 is thus diminished and in certain cases annulled.

The operating characteristics according to the invention further provide the following advantages:

On the one hand when the total pressure in the oxygenation 1 is at its highest, especially at the end of the alternate supply period $a$, the concentration of gaseous oxygen in the gaseous atmosphere 3 is then at its lowest value.

Correlatively, if at the end of the alternate period $a$ a blow-out gas is to be evacuated from the zone 1, this latter is relatively poor in oxygen and the efficiency of utilization of the oxygenation gas is not substantially affected by the blow-out action in question.

On the other hand, taking into account the physical conditions prevailing during the alternate period $a$ and the sub-period $e$, the oxygenation of the mixed liquor is particularly effective. On the one hand, the quantity of oxygen transferred to the biomass during the periods $a$ and $b$ is particularly large and on the other hand this transfer is effected with a particularly rapid kinetics; this is generally very favorable for the process of oxygenation of the mixed liquor.

The methods of operation described above, characteristic of the invention, may be carried into effect in two different ways:

In the first place, and in accordance with FIG. 1, the oxygenation gas coming from the source 25 and the gaseous atmosphere 3 delivered by the compressor 12 are introduced at the heart of the liquid mass 2 of the biochemical oxidation system, into upward moving gaseous circulation zones 600 and 700, respectively different, by two respective gas-introduction separate means, namely the diffuser 21 and the diffuser 26. They may also be introduced into a single upward-movement zone by means of a common diffuser.

Secondly, in accordance with FIG. 3, the oyxgenation gas, coming from the source 25, and the gaseous atmosphere delivered by the compressor 12 are introduced at the heart of the liquid mass 2 of the biochemical oxidation system, into the same upward-moving gas circulation zone 600 by the same gas-introduction means 21. The introduction pressure of the oxygenation gas, that is to say the pressure at the outlet of the valve 39 is greater than the introduction pressure of the gaseous atmosphere in the heart of the liquid mass 2, that is to say than the pressure at the delivery of the compressor 12, so that when the oxygenation gas is supplied to the zone 1, the delivery of the compressor 12 becomes blocked in such manner that the recycled gaseous atmosphere cannot penetrate into the centre of the liquid mass 2 as long as the oxygenation gas is being fed to this latter.

Referring now to FIG. 4, the oxygenation described with reference to FIGS. 1 to 3 is integrated in a purification treatment for waste water, comprising a main collector 35 for the waste water (sewage for example), a primary treatment (I) or pre-treatment of the untreated waste water, for example a decantation effected in a tank 36, a secondary (II) or biological treatment of the pre-treated water, comprising an oxygenation of the pre-treated water such as described with reference to FIGS. 1 to 3, and a decantation of the mixed liquor, by which a clarified water is obtained in a clarifier 37, comprising an inlet connected to the evacuation conduit 5 of the oxygenation zone 1, an outlet 38 connected by a pump 39 to the inlet 34 of activated sludge into the oxygenation zone 1, and an outlet 40 for the clarified water, when so desired a tertiary treatment (III) of the clarified water, intended to separate out certain particular polluting agents, not eliminated during the course of the secondary biological treatment, with an evacuation system 41 for the clarified water.

With reference to FIGS. 5 to 15, there will now be described various regulation systems according to the present invention. In order to simplify FIGS. 6, 7, 8, 10, 11 and 13, the oxygenation device described with reference to FIG. 1 or FIG. 3, has been represented on these drawings by a simple rectangle 44, with certain common reference numbers.

With reference to FIGS. 5 to 15, the description of the various methods of regulation according to the present invention will be given with the utilization of the following symbols:

P: The total pressure existing in at least part if not the whole of the gaseous atmosphere 3 present in the oxygenation zone 1. This pressure is detected by a detector device 46 and is converted to an analogue signal (air pressure or electrical voltage for example) by a transmitter device 47, for example a pressostat. This total pressure is the first parameter to be regulated chosen in accordance with the invention.

$z$: The value of the analogue signal of total pressure P; by extension, the real value and the detected value of the total pressure P or first parameter to be regulated, will be designated by the letter $z$.

$O_a$: The concentration in gaseous oxygen in at least part if not the whole of the gaseous atmosphere 3 present in the oxygenation zone 1. This concentration of gaseous oxygen is detected by a detector device 48 and converted to an analogue signal by a transmitter device 49, for example an analyzer for gaseous oxygen. This concentration of gaseous oxygen is the second parameter to be regulated, chosen in accordance with the invention.

$y$: The value of the analogue signal for concentration of gaseous oxygen $O_a$. By extension, the real value and the detected value of the concentration $O_a$ of gaseous oxygen, the second parameter to be regulated, will be designated by the letter $y$.

$O_e$: The concentration of dissolved oxygen in at least part if not the whole of the liquid mass 2 present in the oxygenation zone 1. This concentration is detected by a detection device 50 and is converted to an analogue signal by a transmitter device 51, for example is analyzer for dissolved oxygen. This concentration of dissolved oxygen in the third parameter to be regulated, chosen in accordance with the invention.

$x$: The value of the analogue signal $O_e$ of concentration of dissolved oxygen. By extension, the real value and the detected value of the concentration $O_e$ of dissolved oxygen, the third parameter to be regulated, will be designated by the letter $x$.

$x_c, y_c, z_c$: The reference values of $O_e$, $O_a$ and P respectively characterizing the state of reference C of the biochemical oxidation system present in the oxygenation zone 1. For a given oxygenation device 44 and for a given mechanical power built into the mechanical oxygenation means 12, the state of reference C chosen for the biochemical oxidation system, and in consequence the values $x_c, y_c, z_c$ determined in a univocal member a so-called reference value which may in particular be equal to a so-called nominal value of the quantity of oxygen transferred per unit of time from the source 25 of the oxygenation gas to the biomass present in the oxygenation zone 1. This nominal value of the quantity of oxygen transferred is in equivalency with the nominal value chosen for the quantity of oxygen consumed by the biomass per unit of time, as a function of the variations of polluting charge applied to the oxygenation zone 1. Generally speaking, the nominal value retained for the quantity of oxygen consumed is equal to the quantity of oxygen consumed for the average polluting charge applied to the oxygenation zone 1. In conclusion, the values $x_c, y_c$, and $z_c$ may be those retained by a person skilled in the art, on the one hand for the determination of the nominal conditions of operation of the oxygenation device 44, and on the other hand for the dimensioning and specifications of the equipments necessary for this latter. The whole of the detected values $x, y, z$ thus characterize an instantaneous state of the biochemical oxidation system, and enable its difference with respect to the reference state C to be evaluated.

$z_e$: Pre-determined, so-called economic safety value of the first parameter P. This value $z_e$ corresponds to the threshold above which any supply of oxygenation gas through the valve 2 is liable to result in an evacuation of blower gas through the valve 33. In the case of FIGS. 5, 13, 14 and 15, $z_e$ is greater than $z_c$, while in the case of FIGS. 7 and 10, $z_e$ is equal to $z_c$.

$O'_a$: The concentration of gaseous oxygen in at least one part, the same as or different from the part in which $O_a$ is detected, or in the whole of the gaseous atmosphere 3 present in the oxygenation zone 1. As for $O_a$, if necessary, $O'_a$ may be detected and transmitted in the form of an analogue signal of value $y'$. This concentration of gaseous oxygen may be the first regulating quantity chosen in accordance with the invention. By extension, the real and/or corrected value of $O'_a$, the first regulating quantity, will be designated by the letter $y'$.

$M$: The mechanical power given to the mechanical means 12 or 12, 14, 16 of oxygenation. This mechanical power may be the first regulating quantity chosen according to the invention. This mechanical power may result from the conversion of an analogue correction signal of value $p$, by means of a transmitter 52, for example a contactor of the electric motor $M_o$ (not shown in FIGS. 7 and 8), coupled to the compressor 12, or a contactor of the various electric motors $M_o, M_1, M_2$ (not shown in FIGS. 10 and 11), coupled to the compressors 12, 14, 16 respectively. By extension, the real and/or corrected value of the said mechanical power, or first regulating quantity, will be designated by the letter $p$.

$p_2$: The nominal constant value of the mechanical power $M$, incorpoated in the mechanical oxygenation means 12. This nominal value corresponds to the nominal conditions of operation chosen by those skilled in the art for the oxygenation device 44.

$O_1$: The quantity of oxygenation gas supplied per unit of time to the oxygenation zone 1. This quantity is the second regulating quantity chosen according to the invention. When the supply of oxygenation gas is carried out in a fractional manner, as previously explained, $O_1$ is the ratio between the total quantity of oxygenation gas, expressed in mass units, supplied to the oxygenation zone for a previously chosen period of time, for example one or several minutes, and this previous chosen period of time. This quantity $O_1$ may result from the conversion of an analogue correction signal of value $o$ by means of a transmitter, for example the operating device 7 of the valve 29. By extension, the real and/or corrected value of the quantity of oxygenation gas supplied per unit of time to the oxygenation zone 1 (the second regulating quantity) will be designated by the letter $o$.

$a, b$: When the supply of oxygenation gas is effected in a fractional manner, as previously described, $a$ and $b$ (see FIG. 2a) represent respectively the duration of the alternate supply period of oxygenation gas and the duration of the alternate interruption period of the supply of oxygenation gas. One and/or the other of the periods $a$ and $b$ condition the value of $\sigma$; thus, when the supply of oxygenation gas is effected in a fractional manner, the analogue correction signal of $O_1$ of value $o$ is converted in the control device 7 or transmitter, to an operating signal for the valve 29 having two components, namely an opening period $a$ of the valve 29 and a closure period $b$ of the valve 29. By extension the real and/or corrected values of the opening and closure times respectively of the valve 29, and in consequence the durations of the alternate supply and periods of interruption of supply of oxygenation gas respectively will be designated by the letters $a$ and $b$.

$a_o, b_o$: The nominal constant values of the period of opening $a$ and the period of closure $b$ of the valve 29. These nominal constant values correspond to the nominal conditions of operation adopted by those skilled in the art for the oxygenation device 44.

$a_c, b_c$: The reference values of the durations $a$ and $b$ of the periods of supply and interruption of supply respectively of oxygenation gas. These reference values may especially be regulated by means of the system of regulation shown in FIG. 7.

$a_c^0, a_{c_1}, a_c^2, a_c^3, a_c^4$: The regulated and decreasing values of the reference value $a_c$ of the duration $a$, according to the previous paragraph. $A_c^2$ is equal to the nominal value $a_o$ of the duration $a$.

$b_c^0$, $b_c^1$, $b_c^2$, $b_c^3$, $b_c^4$: The regulated increasing values of the reference value $b_c$ of the duration $b$ according to the previous paragraph $b_c^2$ is equal to the nominal value $b_o$ of the duration $b$.

$y_c^2$: The nominal constant value of the reference value $y_c$ of the second parameter $o_a$. In fact, as will be seen below with reference to FIGS. 5 to 9 and 13, the reference value $y_c$ is capable of being corrected, depending on the difference of the biochemical oxidation system with respect to its reference state C. The nominal value $y_c^2$ corresponds to the nominal conditions of operation adopted by those skilled in the art for the oxygenation device 44.

$y_c^0$, $y_c^1$, $y_c^3$, $y_c^4$ etc.: The corrected and decreasing values of the reference value of the second parameter $O_a$, in accordance with the preceding paragraph.

$\sigma_o$: The nominal constant value of the second regulating quantity $O_1$. This quantity corresponds to the nominal conditions of operation adopted by those skilled in the art for the oxygenation device 44. When the supply of oxygenation gas is effected in a fractional manner, $\sigma_o$ is the nominal value of $O_1$ when the durations of the alternate supply periods $a$ and interruption of supply $b$ are respectively equal to $a_c^0$ and $b_c^0$, or respectively to $a_o$ and $b_o$.

$\sigma_c$: The reference value of the second regulating quantity $O_1$, being capable especially of regulation by means of the regulation system in accordance with FIG. 7.

$\sigma_c^0$, $\sigma_c^1$, $\sigma_c^2$, $\sigma_c^3$, $\sigma_c^4$: The regulated and decreasing values of the reference value $\sigma_o$ of the second regulating quantity $0_b$, according to the preceding paragraph; $\sigma_c^2$ is equal to the nominal value $\sigma_o$ of the second regulating quantity.

$x_0$, $x_1$, $x_2$, $x_3$, $x_4$, etc.: The pre-determined increasing values of the third parameter $O_e$, $x_0$ being for example equal to $x_b$ and $x_2$ being equal to $x_n$ or $x_c$. In accordance with FIGS. 7 and 9 these pre-determined values are utilized to automatically regulate $y_c$, $O_c$, $a_c$ and/or $b_c$. In accordance with FIGS. 10, 11 and 12d, these pre-determined values are also utilized for automatically regulating $p$.

$x_b$: The pre-determined value of the third parameter $O_e$, known the biological safety parameter, which may be less than $x_c$. This value $x_b$ corresponds to the threshold below which the biomass metabolizes the polluting bio-degradable matter in anaerobiosis. $x_b$ is for example equal to 2 ppm of dissolved oxygen.

$x_e$: The pre-determined value of the third so-called economic safety parameter $O_e$, greater than $x_b$ and capable of being higher than $x_c$. This value $x_e$ corresponds to the threshold above which any supply of oxygenation gas through the valve 29 is liable to result in evacuation of blow-out gas through the valve 33.

$x_r$: The reference value of $x$, equal to $x_c$ or to $x_b$, according to the forms of embodiment of the invention. The difference of $x$ with respect to $x_r$ is utilized for the automatic correction of $y_c$, $\sigma_c$ and/or $b_c$.

$x_n$: The nominal value of $x$, possibly equal to $x_c$ or $x_r$, corresponding to the nominal conditions of operation chosen by those skilled in the art for the oxygenation device 44.

$\sigma_b$: The pre-determined value of the second so-called biological safety quantity $O_1$, greater than $\sigma_o$. This value corresponds for example to the quantity of oxygenation gas supplying the oxygenation device 44 per unit of time, when the valve 29 is fully open; or, when the supply of oxygenation gas is effected in a fractional manner, this value corresponds to the quantity of oxygenation gas supplied per unit of time to the oxygenation device 44 when the valve 29 is continuously open.

$z_f$: The pre-determined value of the so-called safety on over-pressure first parameter P. higher than atmospheric pressure and than $z_o$; $z_f$ is the threshold above which a blow-out gas is evacuated from the oxygenation zone 1, through the conduit 32 and the control valve 33.

$z_i$: The pre-determined value of the so-called safety on depression of the first parameter P, lower than atmospheric pressure and than $z_o$; $z_i$ is the threshold below which atmospheric air is introduced into the oxygen zone 1, through the conduit 32 and the control valve 43.

DTO: The total demand for oxygen of the flow to be treated, introduced into the oxygenation device 44, and more particularly into the oxygen zone 1 through the conduit 4. This DTO constitutes the first parameter of oxidation level, characterizing at least partly the polluting charge applied to the oxygenation zone 1, and in consequence the foreseeable consumption of oxygen by the biomass. In fact, the greater the value of the DTO introduced into the oxygenation zone 1, the more oxygen will be consumed by the biomass finally per unit of time. This DTO is detected (see FIG. 13) by a detector device 56 mounted on the upstream side of the oxygenation zone 1, for example upstream of the primary treatment (I) shown in FIG. 4. The DTO detected is converted to an analogue signal by an appropriate transmitter device 58.

$w$: The value of the analogue signal of the DTO. By extension, the real value and the detected value of the DTO, or first parameter of oxidation level, will be designated by the letter $w$.

D: The flow-rate of the flow to be treated, introduced into the oxygenation device 44, and more precisely into the oxygenation zone 1 through the conduit 4. This flow-rate D constitutes a second parameter of oxidation level, characterizing at least partly the polluting charge applied to the oxygenation zone 1, and in consequence the predictable consumption of oxygen by the biomass. In fact, the more the flow-rate D introduced into the oxygen zone 1 is large, the more oxygen the biomass will finally consume per unit of time.

This flow-rate D is detected (see FIG. 13) by a detector device 55 mounted on the upstream side of the oxygenation zone, for example at the same place as the detector 56. The flow-rate D detected is converted to an analogue signal by an appropriate transmitter device 57.

$v$: The value of the analogue signal of the flow-rate D. By extension, the real and detected values of the flow-rate D, the second parameter of oxidation level, will be designated by the letter $v$.

$w_o$, $v_o$: The nominal values of $w$ and $v$ respectively. These quantities correspond to the nominal conditions of operation adopted by those skilled in the art for the oxygenation device 44.

All the regulation systems represented in FIGS. 5, 7, 8, 10, 11, 13, 14 and 15 comprise:

1. A means for characterizing the state of the biochemical oxidation system present in the oxygenation zone 1, comprising on the one hand the whole of at least the three detectors 46, 48 and 50, permitting the detection of the three parameters to be regulated, P, $O_a$, and $O_e$ respectively, and on the other hand the whole of at least the three transmitters 47, 49 and 51 respectively associated with the detectors 46, 48 and 50.

2. A means for acting on the said biochemical oxidation system, enabling it to be kept in a so-called reference state and maintaining each of the three parameters to be regulated, P, $O_a$, and $O_e$ at the reference values $z_c$, $y_c$, and $x_c$ respectively. This action means is a unit constituted by at least one first regulator of any one of the first two regulating quantities, namely $O'_a$ and $M$ and a second regulator for the second regulating quantity $O_t$. The existence and the nature of the first regulator depending on the form of embodiment of the invention employed, these latter will be explained below. The second regulator is identical with the operating device 7 of the valve 29.

3. An automatic regulating means 20 (see FIGS. 5, 7, 8, 13, 14 and 15) or 10 (see FIGS. 10 and 11) for the regulator of the first regulating quantity $O'_a$, as a function of the difference between the detected value $x$ of the third parameter $O_e$ and its reference value $x_r$.

4. An automatic regulating means 20 or 10, identical with the regulating means previously defined for the regulator 7 of the second regulating quantity $O_1$, as a function firstly of the difference between the detected value $z$ of the first parameter P to be regulated and its reference value $z_c$, secondly of the difference between the detected value $y$ of the second parameter $O_a$ and its reference value $y_c$, and thirdly of the difference between the detected value $x$ of the third parameter $O_e$ to be regulated and its reference value $x_c$.

In accordance with FIGS. 5 and 13, the automatic regulation means 20 is a programming device 53 of the "micro-processor" type, and thus has a programmed logic system. This system 53, for example a "micro-processor" sold commercially under the name "PB 6" by the French Company Merlin Gerin, has been shown symbolically in the above-mentioned drawings and comprises:

A treatment unit UT;

A memory M for storing on the one hand the information I necessary for the regulation of the biochemical oxidation system, and on the other hand the programme P necessary for carrying out the said regulation;

An input E for the reception of digital detection signals and an output S for the emission of digital correction signals.

The programme device 53 is coupled to a converter permitting any analogue signal to be converted to a digital signal and conversely.

According to FIG. 7, the automatic regulating means 20 is an electrical system and therefore a logic cabled system. This system comprises:

(1) An electro-valve comprising the operating device 7 and the valve 29 previously described. The operating device 7 is supplied by two electric conductors 67 and 68, and the valve 29 is closed when the operating device 7 is under tension and is opened when the device 7 is off-voltage.

(2) A comparator 59 for comparing $z$ with $z_c$. In the case of FIGS. 7, 8, 9, and also 10, 11 and 12, the reference value $z_c$ of the first parameter P is equal to the economie safety value $z_e$, so that the comparator 59 compares $z$ with $z_e$. The comparator 59 comprises a contactor 62 and two contact studs 60 and 61, corresponding to the conditions $z < z_e$ and $z > z_e$ respectively, connected electrically to the contractor 64 of the comparator 63 described below, and to the electrical conductor 68. The contactor 62 can only take-up two positions, respectively in contact with the studs 60 and 61.

(3) A comparator 53 comparing $y$ with $y_c$. This comparator comprises a contactor 64 and two contact studs 65 and 66, corresponding to the conditions $y < y_c$ and $y > y_c$ respectively, connected electrically to the contactor 69 of the first compartment 70 of the comparator 71 described below, and to the electric conductor 68. The contactor 64 can only take-up two positions, in contact with the studs 64 and 66 respectively.

(a) A comparator 71 for comparing $x$ with $x_r$ and $x_e$, comprising a first compartment 70 for a comparison of $x$ with $x_e$ and a second compartment 72 for comparing $x$ with $x_b$. The first compartment 70 comprises a contactor 69 and two contact studs 73 and 74, corresponding to the conditions $x < x_e$ and $x > x_e$ respectively, electrically connected to the contactor 75 of the second compartment 72 and to the electric conductor 68. The contactor 69 can only take-up two positions, in contact with the studs 73 and 73 respectively. The second compartment 72 comprises a contactor 75 and two contact studs 76 and 77, respectively corresponding to the conditions $x < x_b$ and $x > x_b$, connected electrically to the electric line 78 supplying the relay 80 specified below, and to the contactor 81 of the impulse regulator 82 with proportional action, defined below. The contactor 75 can only take-up two positions, in contact with the studs 76 and 77 respectively.

(5) A relay 80, electrically supplied by the conductors 67 and 78. This relay controls a contactor 83 arranged on the electric conductor 67 enabling the contactor to be opened or closed depending on whether an electrical voltage is present or not between the conductors 67 and 78.

(6) A proportional-action impulse regulator, for example a regulator sold commercially under the name "IPL 10" by the French Company Merlin Gerin. This regulator 82 comprises a contactor 81 and two contact studs 84 and 85, the first not electrically connected and the second connected electrically to the electric supply conductor 78 of the relay 80. The contactor 81 can only take-up two positions, respectively in contact with the studs 84 and 85.

The regulator 82 delivers successive impulses of duration $a$, during which the contactor 81 is in contact with the stud 85, these impulses being separated by intervals of duration $b$, during which the contactor is in contact with the stud 84. In consequence, during the impulses of duration $a$, the relay 80 is under tension, the contactor 83 is in the open position, and the valve 29 is open, while during the intervals of duration $b$, the relay 80 is not under tension, the contactor 83 is in the closed position, and the valve 29 is closed.

According to FIGS. 9b and 9c, the regulator 82 enables the duration $a$ to be regulated automatically to a corrected value varying on each side of the value $a_c$, in the opposite sense to the variation of $x$ on each side of $x_c$, the difference between the corrected value of $a$ and $a_c$ being proportional to the difference between $x$ and $x_c$.

(7) A regulator 86 for $y_c$ and $a_c$, continuously supplied electrically between the conductor 67, by a branch line 87, and another conductor 88. This regulator 86 comprises a pointer 87 and for example five studs marked with the numbers 0, 1, 2, 3 and 4. The five studs referred to correspond respectively to the pre-determined increasing values $x_0$, $x_1$, $x_2$, $x_3$, $x_4$, previously defined.

These five studs define four equal automatic regulation intervals of $y_c$ and $a_c$, of rank 1 to 4, operating as follows:

Between $x_0$ and $x_1$, that is to say in the interval of row 1, $y_c$ and $a_c$ are automatically assigned to the values $y_c^0$ and $a_c^0$ respectively;

between $x_1$ and $x_2$, that is to say in the interval of row 2, $y_c$ and $a_c$ are automatically assigned to the values $y_c^1$ and $a_c^1$ respectively;

when $x$ is equal to $x_2$, $y_c$ and $a_c$ are automatically regulated to the values $y_c^2$ and $a_c^2$ respectively;

between $x_2$ and $x_3$, that is to say in the interval of row 3, $y_c$ and $a_c$ are automatically regulated to the values $y_c^3$ and $a_c^3$ respectively;

between $x_3$ and $x_4$, that is to say in the interval of row 4, $y_c$ and $a_c$ are automatically assigned to the values $y_c^4$ and $a_c^4$ respectively.

In consequence, in the four automatic regulation intervals $x_0-x_1$, $x_1-x_2$, $x_2-x_3$, $x_3-x_4$, $o_c$ is automatically regulated to the values $o_c^0$, $o_c^1$, $o_c^3$ and $o_c^4$, and for $x = x_2$, $\sigma_c$ is automatically regulated to the value $\sigma_c^2$. The intervals between $y_c^0$ and $y_c^1$, $y_c^1$ and $1_c^3$, $y_c^3$ and $y_c^4$ are for example equal. This is also true for example for the intervals between $a_c^0$ and $a_c^1$, $a_c^1$ and $a_c^3$, $a_c^3$ and $a_c^4$. Correspondingly, it is also true for example for the intervals between $o_c^0$ and $o_c^1$, $o_c^1$ and $o_c^3$, $o_c^3$ and $o_c^4$.

In the same way as previously, the automatic regulation means 20 is capable of regulating automatically any parameter of fractional supply of oxygenation gas, different from the opening period of the valve 29 and in consequence from the duration $a$ of the supply period of oxygenation gas. The parameter regulated may be for example:

The duration of closure of the valve 29 and in consequence the duration $b$ of the alternate period of supply interrupt of oxygenation gas;

and/or the duration $c$ of the supply period (see FIG. 2a) of oxygenation gas, that is to say the total duration of an alternate period of supply $a$, followed by an alternate period $b$ of interruption of supply of oxygenation gas;

and/or the mass flow-rate $q$ (see FIG. 2a) of the oxygenation gas during the alternate period of supply $a$ of oxygenation gas;

all these parameters partly charcterizing and conditioning valve $\sigma$ of the second regulating quantity $O_1$.

As previously stated, the regulated values of the duration $a$ of opening of the valve 29 must be chosen in such manner that $a$ remains at most equal to the average duration of travel $d$ (see FIG. 2a) of the bubbles of oxygenation gas.

When, in order to respect the equivalency between O and the quantity of oxygen consumed per unit time by the biomass, the corrected value of $a$ is led to equal and even exceed $d$. It is then necessary to regulate another parameter of fractional supply of oxygenation gas, identical to one of those previously defined, in such manner as to observe the equivalency referred to, with a regulation of $a$ to a corrected value at most equal to $d$. Thus, in addition to the regulation of $a$, it is possible to regulate and reduce $b$ or $c$ automatically, or to regulate and increase $q$ automatically.

According to FIG. 10, the automatic regulating means 10 is also an electrical system and therefore a cable logic system. This system comprises:

(1) An electro-valve as described in the previous paragraph (3) referring to FIG. 7;

(2) A comparator 59 for comprising $z$ with $z_c$ ($z_2 = z_e$) as described in the preceding paragraph (2) referring to FIG. 7;

(3) A comparator 63 for comparing $y$ with $y_c$, as described in the preceding paragraph (3) referring to FIG. 7;

(4) A comparator 71 for comparing $x$ with $x_b$ and $x_e$, difference from that described in the preceding paragraph (4) to the extent that the impulse regulator 82 of FIG. 7 is now replaced by a non-regulatable impulse generator 90, as described below;

(5) A relay 80 as described in the preceding paragraph (5) referring to FIG. 7;

(6) An impulse generator 90 comprising elements 81, 84 and 85 corresponding to the definitions of the previous paragraph (6). The generator 90 delivers successive impulses of predetermined duration $a_o$, separated by intervals of predetermined duration $b_o$;

(7) A regulator 01 of $p$ and $a_c$, supplied electrically between the conductor 67 by a branch line 87, and the contact stud 76 by a branch line 88'. This regulator 91 comprises a contactor 87' and for example three contact studs identified by the numbers 0, 1, 2, the three said studs corresponding respectively to the pre-determined decreasing values $x_2$, $x_1$, $x$ previously defined. These three studs define two intervals of automatic regulation of $p$ and $a_c$, of row 1 and 2, as follows:

between $x_2$ and $x_1$, that is to say in the first regulation interval, the contactor 87' is in contact with the stud having the reference 1 and $p$ and $a_c$ are assigned automatically to the values $p_1$ and $a_c^1$ respectively. In the present case, $x_2$ is equal to $x_b$;

between $x_1$ and $x_o$, that is to say in the second regulation interval, the contactor 87' is in contact with the stud having the reference 2, and $p$ and $a_c$ are assigned automatically to the values $p_o$ and $a_c^o$ respectively, where $p_o$ is greater than $p$. The interval between $p_2$ and $p_1$, $p_1$ and $p_o$ are for example equal when $p_1 = 2p_2$ and $p_o = 3p_2$. The same thing is true for example for the intervals between $a_c^2$ and $a_c^1$, $a_c^1$ and $o_c$. In the intervals $x_2-x_1$ and $x_1-x_o$, $o_c$ is automatically regulated to the values $o_c^1$ and $o_c^o$ respectively.

(8) A zero re-setting device 89, supplied electrically between the contact stud 74 and the branch line 87. This device 89 brings the contractor 87' of the regulator 86 back into contact with the stud having the reference O, as soon as an electric voltage is available between 74 and 87. In consequence, the operation of the regulation device 91 is as follows:

As long as $x$ remains greater than $x_b$ and less than $x_a$, the regulator 91 is not under voltage, the contactor 87 remains in contact with the stud having the reference O, and $p$, $a_c$ remain regulated at their values $p_2$ and $a_c^2$ respectively. This means that the biochemical oxidation system is working under its rated conditions;

As soon as $x$ becomes at most equal to $x_b$, the regulator 91 is then put under voltage until $x$ again becomes greater than $x_b$. During this period under tension, the contactor 87' positions itself automatically in contact with one of the studs having the numbers 1 and 2, and $p$ and $a_c$ are then regulated to new values, different from $p_2$ and $a_c^2$ respectively, according to the row (1 or 2) of the interval of regulation in which $x$ is located. This means that the biochemical oxidation system is moving away at fault from the nominal conditions of operation;

when $x$ again becomes higher than $x_b$, but remains less than $x_e$, the regulator 91 is no longer under voltage. However, the contactor 87' remains in contact with the stud on which it was positioned at the moment of opening of the electric supply circuit of the regulator 91; $p$ and $a_c$ then remain regulated at their new values. This means that the biochemical oxidation system has moved away by defect and in a stable manner, from the rated conditions of working;

as soon as $x$ becomes at least equal to $x_e$, the zero-resetting device 89 is then put under voltage and the contactor 87' then becomes automatically brought back into contact with the stud having the reference number. At the same time, $p$ and $a_c$ are again regulated to their respective values of $p_2$ and $a_c{}^2$. This means that the biochemical oxidation system is returning to its rated conditions of operation.

It will be understood as previously that the automatic regulating means 10 is capable of automatically regulating any parameter of fractional supply of oxygenated gas, different from $a$, for example $b$ and/or $c$ and/or $c$, and this in such manner as to satisfy the condition $a \leqq$ irrespective of the quantity of oxygen consumed by the biomass per unit of time.

According to FIG. 11, the oxygenation device 44 of FIG. 12 comprises a mechanical oxygenation means composed of $(2 + 1)$ recycling compressors in parallel, namely 12, 14 and 16, each sucking-in the gaseous atmosphere 3 on one side and each delivering the gaseous indrawn atmosphere into the liquid mass 2 of the biochemical oxidation system. Each compressor 12 or 14 or 16 consumes a mechanical power equal to the nominal value $p_2$ of M.

The analogue correction signal $p$ admitted by the regulator 91 is converted in the transmitter 52 to an operating signal of the motors $M_o$, $M_1$ and $M_2$ (not shown in FIGS. 10 and 11), driving the compressors 12, 14 and 16 respectively, this being effected as follows:

irrespective of the value of $p$, the so-called nominal re-cycling compressor 12, chosen from the $(2 + 1)$ compressors referred to, works continuously and consumes the nominal value $p_2$ of M;

According to the corrected value of $p$, namely $p_1 = 2p$ or $p_o = 3p_2$, that is to say as a function of the value of $x$ with respect to the two intervals of automatic regulation of $p$ pre-established on the regulator 91, and more precisely as a function of the row interval 1 or 2, in which $x$ is located, the so-called additional re-cycling compressor 14 or compressors 14 and 16 are respectively and automatically put into operation.

In consequence, according to the form of embodiment shown in FIGS. 10 and 11, the first regulator of the first regulating quantity chosen, namely M, is constituted by the regulator 91.

As will be seen below, according to the forms of embodiment shown in FIGS. 5, 7 and 8, 13, the first regulating quantity chosen, namely $O_a'$ is identical with the second parameter to be regulated, namely $O_a$, whereby the regulation of $y'$ consists of a regulation of $y_c$. Correlatively, according to FIGS. 7 and 8, the first regulator of the first regulating quantity chosen, namely $o$ is constituted by the regulator 86.

According to FIGS. 5 and 13, and as will be seen below, the information I and the programme P stored in the memory M of the programme device 53 are such that, for an instantaneous state of the biochemical oxidation system, and consequently for a given departure of this latter from its reference state C, the corrected values $a$ and $b$ stored in the memory M, make it possible firstly to correct $y_c$ to a new value different from $y_c{}^2$, and secondly to correct $o_c$ to a new value different from $O_c{}^2$.

The new value of $o_c$ makes it possible simultaneously to correct $y_c$ to its new value and to satisfy the new consumption of oxygen of the biomass per unit of time detected by the difference of the system in question with respect to its reference state C. In consequence, according to FIGS. 5 and 13, the first regulator is coincident with and identical to the second regulator 7.

As will be seen below, according to FIG. 14 relating to an oxygenation of the continuous multi-stage type the first regulating quantity chosen, namely $O_a'$, is identical to the concentration of gaseous oxygen in the portion $3a$ of the gaseous atmosphere 3 of the biochemical oxidation system, limited by the upper part of the first oxygenation compartment 92a.

In the same manner as previously, the automatic regulation means consist of a programming device 53, and by virtue of the information I and the programme P stored in the memory M, as a function of the difference of the biochemical oxidation system with respect to its reference state $a$ and $b$ are automatically corrected in such manner as to bring $y'$ to a new value and to give $o_c$ a new value in correspondance simultaneously with the new value of $y'$ and the new value of the biological consumption of oxygen. In consequence, according to FIG. 14, the first regulator is identical with the second regulator 7.

As will be seen below according to FIG. 15, relating to an oxygenation of the single-stage discontinuous type, the first regulating quantity, namely $O'_a$ is chosen as for the continuous single-stage oxygenation devices shown in FIGS. 5 and 13. As the automatic regulating means 20 also consists in this case of a programming device 53, programmed as in FIGS. 5 and 13, the first regulator is also identical with the second regulator 7.

All the systems of regulation shown in FIGS. 5, 7 and 8, 10 and 11, 13, 14, 15, enable the biochemical oxidation system contained by the oxygenation device 44 and more precisely in the oxygenation zone 1 to be regulated in accordance with the following general definition.

Firstly, by means of the detection unit 46, 48, 50 and the transmission unit 37, 39, 51, the instaneaneous state $(x, y, z)$ of the biochemical oxidation system is characterized by the detection in the unit of at least the three following parameters:

P: This parameter represents the total pressure existing on the one hand in the whole of the gaseous atmosphere 3 of the biochemical oxidation system, and more particularly in the upper part of the oxygenation compartment 1, in the case of FIGS. 5, 7 and 8, 10 and 11, 13, 15, and on the other hand in the portion $3a$ of the gaseous atmosphere 3 of the said system, limited by the upper part of the first oxygenation compartment 92a in the case of FIG. 14.

$O_a$: This parameter represents the concentration of gaseous oxygen on the one hand in the whole of the gaseous atmosphere 3 of the said system, and more precisely in the upper part of the oxygenation compartment 1 in the case of FIGS. 5, 7 and 8, 10 and 11, 13, 15, and on the other hand in the portion $3c$ of the gaseous atmosphere of the said system, limited by the upper portion of the last oxygenation compartment 92c in the case of FIG. 14

$O_e$: This parameter represents the concentration of dissolved oxygen, on the one hand in the whole of the liquid mass 2 of the system in question, and more particularly in the lower part of the oxygenation compartment 1 in the case of FIGS. 5, 7 and 8, 10 and 11, 13, 15, and on the other hand in the portion 2c of the liquid mass of the said system, limited by the lower part of the last oxygenation compartment 92c in the case of FIG. 14.

Secondly, by virtue on the one hand of the first regulator 7 in the case of FIGS. 5, 7 and 8, 13, 14, 15 or of the first regulator 91 in the case of FIGS. 10 and 11, and on the other hand of the second regulator 7 in the case of FIGS. 5, 7 and 8, 10 and 11, 13, 14, 15, action is made on the biochemical oxidation system so as to maintain it in the reference state C, namely ($x_c$, $y_c$, $z_c$) in the case of FIGS. 5, 13, 14, 15, or ($x_c$, $y_c$, $z_c$) in the case of FIGS. 7 and 8, 10 and 11, and for maintaining each of the three parameters P, $O_a$, $O_e$, at a reference value corresponding to the reference state C chosen. In order to do this, as described below, the whole of at least the two regulating quantities which follow are automatically regulated:

(1) $O'_a$ in the whole of the gaseous atmosphere 3 of the biochemical oxidation system, in the case of FIGS. 5, 7 and 8, 13, 15 and $O'_a$ in the portion 3a of the gaseous atmosphere 3 of the above system, limited by the upper part of the first oxygenation compartment 92a in the case of FIG. 14, of $m$ conferred on the mechanical oxygenation means 12, 14, 16 in the case of FIGS. 10 and 11, (2) The quantity M.

Thirdly, by virtue of the automatic regulation means 10 or 20, and more precisely the programming device 53 in the case of FIGS. 5, 13, 14 and 15, the regulator 86 in the case of FIGS. 7 and 8, and the regulator 91 in the case of FIGS. 10 and 11, $y'$ or $p$ (first regulating quantity) are automatically regulated as a function of the difference between $x$ and $x_c$.

Fourthly, by virtue of the automatic regulation means 10 or 20 and more precisely the programming device 53 in the case of FIG. 5, 13, 14 and 15, or the comparators 59, 63, 71 and the regulator 82 in the case of FIGS. 7 and 8, or the comparators 59, 63, 71 and the regulator 91 in the case of FIGS. 10 and 11, the second regulating quantity $\sigma$ is automatically regulated as a function of the difference between $z$ and $z_c$ (FIGS. 5, 13, 14, 15), or between $z$ and $z_e$ (FIGS. 7 and 8, 10 and 11) the difference between $y$ and $y_c$ and the difference between $x$ and $x_c$.

In accordance with FIGS. 5, 7 and 8, 13, 14, 15, the first regulating quantity is the concentration of gaseous oxygen $O'_a$, in at least a portion of the gaseous atmosphere 3 of the biochemical oxidation system, different from or identical to the part of the same gaseous atmosphere in which the first parameter to be regulated $O_a$ is detected. Thus:

In the case of FIGS. 5, 7 and 8, 13, 15, the portion and the part referred to are identical to each other and to the whole of the gaseous atmosphere 3 of the biochemical oxidation system. Under these conditions, $y'$ is equal to $y$;

In the case of FIG. 14, the portion 3a of the gaseous atmosphere previously defined is different from the part 3c of the same gaseous atmosphere, previously defined. Under these conditions, $y'$ is different from $y$.

In any case, this means that $y$ and $y'$ are dependent on each other (FIG. 14) if not identical (FIGS. 5, 7 and 8, 13, 15). In the case of FIG. 14, a pre-established relation exists between $y'$ and $y$, dependent on the exhaustion of oxygen in the gaseous atmosphere 3, of the first compartment 92a to the last compartment 92c.

Under these conditions, if it is desired to correct $y'$, it is $y$ and more precisely $y_c$ which must be corrected so as not to hinder the operation of the regulation system by a blocking of this system at the level of $O_a$. Thus, according to FIGS. 5, 7 and 8, 13, 14, 15, $y$ is automatically regulated at least as a function of the difference between $x$ and $x_c$.

However, in order to correct $y_c$ as previously desired, O is automatically regulated, also as a function of the difference between the regulated value of $y_c$ and the nominal value $y_c^2$, O being furthermore automatically regulated as previously defined.

In accordance with FIGS. 5, 7 and 8, 13, 15, the portion of the gaseous atmosphere 3 of the biochemical oxidation system, in which $O'_a$ and in consequence the first regulating quantity is regulated, is identical to the part of the same gaseous atmosphere in which $O_a$ and in consequence the second parameter to be regulated is detected. Under these conditions, $O'_a$ is identical to $O_a$, and the automatic regulation of $y'$ is an automatic regulation of $y_c$. According to FIGS. 5, 13, 15, this automatic regulation is effected by means of the programming device 53, and according to FIGS. 7 and 8, this automatic regulation is effected by means of the regulator 86.

According to FIGS. 5 and 6, the method of operation of the programming device 53 will now be explained.

The programme P, stored in the memory M, enables the treatment unit UT to carry out in a repetitive manner the following main operations:

(1) Interrogation in cascade of the transmitters 47, 49 and 51 conversion in the converter 54 of the analogue corresponding detection signals $z$, $y$, $x$ to digital detection signals $z_t$, $y_t$, $x_t$;

(2) Successive entry of the digital detection signals $z_t$, $y_t$, $x_t$ into a matrix $m$ of three dimensions, corresponding respectively to P, $O_a$, $O_e$; positioning of the digital detection signals on the $z$ axis, the $y$ axis and the $x$ axis respectively. The instantaneous state of the biochemical oxidation system is then identified in the matrix $m$, inside a cube 93 of coordinates $z_n - z_{n+1}$, $y_p - y_{p+1}$, $x_q - x_{q+1}$, respectively framing the values $z_t$, $y_t$, and $x_t$;

(3) Extraction from the part I of the memory M of the instructions concerning the cube 93 and directed to the times of opening $a$ and closure $b$ of the valve 29;

(4) Emission of a digital correction signal $o_t$, having two digital correction components $a_t$ and $b_t$; conversion in the converter 54 of the digital signal $o_t$ to an analogue correction signal $o$, having two analogue correction components $a$ and $b$;

(5) and so on in a repetitive manner.

According to FIG. 5, the reference state C of the biochemical oxidation system is identified in the matrix $m$, in the interior of a cube 94 of coordinates $x_c$, $y_c^2$, $z_c$, distinct from the cube 93. Generally, the difference between the cube 93 and the cube 94 illustrates the departure of the above-mentioned system from its reference state C. In the portion I of the memory M, the instructions stored concerning the cube 94 correspond to the values $a_o$ and $b_o$ of the opening and closure times of the valve 29, and in consequence to the value $o_o$ of the second regulating quantity $O_1$.

Still in accordance with FIG. 5, the portion I of the memory M comprises a multitude of recesses corresponding to the multitude of cubes 93 of the matrix $m$, these recesses each comprising different instructions for the opening and closure of the valve 29. Although very numerous, the recesses of the part I of the memory M are numerically limited and correspond to a pre-determined number of cubes 93 comprised in the matrix $m$ between the limits $L - z_1$, $L - y_1$, and $x_L = x_1$.

In consequence, the cubes 93 of the matrix $m$ and the corresponding recesses of the part I of the memory M, correspond to a pre-determined working area of the biochemical oxidation system and therefore to a pre-determined range of biochemical consumption of oxygen of the biomass, and in consequence to a certain level of oxidation to effect.

In accordance with FIG. 6, the matrix $m$ has been shown in the plane $(x, y)$, and is constituted by squares corresponding to the cubes 93 previously described, identified on the $x$ axis by the letters $a'$ to $j'$, and on the $y$ axis by the letters $a''$ to $j''$.

For a given system of biochemical oxidation, the instructions stored in each of the recesses of the portion I of the memory M, corresponding to each of the cubes 93 of the matrix $m$ have been calculated in the following manner.

In the first place there is considered the distance apart along the $x$ axis between the cube 93 and the reference cube 94, and in consequence the difference between $x$ and $x_c$. Starting from this difference, a new value is given to $y_c$, according to the following procudure:

(1) When $x$ is less than $x_c$, $y_c$ is increased to a corrected reference value, different from $y_c^2$. The greater the difference between $x$ and $x_c$, the more $y_c$ is increased with respect to $y_c^2$. Thus, for the cube 932, having the coordinates $d'$ and $c''$ in FIG. 6, the instructions stored in the corresponding recess of the portion I of the memory result in bringing the state of the biochemical oxidation system into the compartment $f'/h''$ of the matrix $m$. Thus, for the cube 931 having the coordinates $c'$ and $i''$ in FIG. 6 the instructions stored in the corresponding recess of the portion I of the memory M are intended to bring the state of the said system into the recess $f'/j''$ of the matrix $m$;

(2) when $x$ is greater than $x_c$, $y_c$ is reduced to a corrected reference value, different from $y_c^2$. The greater the difference between $x$ and $x_c$, the more $y_c$ is reduced with respect to $y_c^2$. Thus, for the cube 933 having the coordinates $g'$ and $c''$ in FIG. 6, the instructions stores in the corresponding partition of the portion I of the memory are directed to bring the state of the biochemical oxidation system into the recess $f'/e''$ of the matric $m$. Thus, for the cube 934, having the coordinates $h'$ and $i''$ in FIG. 6, the instructions stored in the corresponding partition of the portion I of the memory M are intended to bring the state of the said system into the recess $f'/d''$ of the matrix $m$.

Secondly, along the $z$ axis, the difference is considered between the cube 93 and the reference cube 94 of the matrix $m$, and in consequence the difference betweeen $z$ and $z_c$. From this difference, a new value is assigned to $o$, depending on the following considerations:

(1) When $z$ is greater than $z_c$, $o$ is reduced. The greater the difference between $z$ and $z_c$, the more $o$ is reduced with respect to $o_o$;

(2) when $z$ is less than $z_c$, $o$ is increased. The greater the difference between $z$ and $z_c$, the more $o$ is increased with respect to $o_o$.

Thirdly, along the $y$ axis, the difference is considered between the cube 93 and the reference cube 94 of the matrix $m$, and in consequence the difference between $y$ and $y_c^2$. From this difference, a new value is assigned to $o$, depending on the following considerations:

(1) When $x$ is different from $x_c$, and when $y$ is less then $y_c^2$, $o$ is increased. The greater the difference between $y$ and the more $o$ is increased with respect to $o_o$.

(2) When $x$ is different from $x_c$, and when $y$ is greater than $y$ $o$ is reduced. The greater the difference between $y$ and $y_c^2$ the more $o$ is reduced with respect to $o_o$.

Fourthly, along the $x$ axis, the difference is considered between the cube 93 and the reference cube 94 of the matrix $m$, and in consequence the difference between $x$ and $x_c$. From this difference, a new value is assigned to $o$, depending on the following considerations:

(1) When $x$ is less than $x_c$, $o$ is increased. The greater the difference between $x$ and $x_c$, the more $o$ is increased with respect to $o_o$;

(2) When $x$ is greater than $x_c$, $o$ is reduced. The greater the difference between $x$ and $x_c$, the more $o$ is reduced with respect to $o_o$.

Fifthly, along the axis corresponding to $x_c$, the difference is considered between on the one hand the new value desired for $y_c$, as a function of the previous considerations, and on the other hand $y_c^2$. From this difference, a new value is assigned to $o$, depending on the following considerations:

(1) When the desired regulated value of $y_c$ is greater than $y_c^2$, $o$ is increased. The greater the difference between the $y_c$ desired and $y_c^2$, the more $o$ is increased with respect to $o_o$;

(2) When the desired regulated value of $y_c$ is less than $y_c^2$, $o$ is reduced. The greater the difference between $y_c$ desired and $y_c^2$, the more $o$ is reduced with respect to $o_o$.

Finally, for each recess of the portion I of the memory M, corresponding to each cube of the matrix $m$, the corrected value of $o$ is obtained by adding together algebraically the four partial corrections, established as before from the respective differences of:

$z$ with respect to $z_c$;

$y$ with respect to $y_c$;

$x$ with respect to $x_c$;

$y_c$ corrected with respect to $y_c^2$.

Thus, considering FIG. 6 and assuming that $z$ is equal to $z_c$, the corrected value of $o$ stored in each of the recesses 831, 932, 933 and 934 is obtained in the following manner.

In order to schematize and clarify the description, it will be assumed that a difference of one recess with respect to the reference recess 94 involves a correction of one unit to $o$, with respect to $o_o$.

For the recess 931, the correction to be made with respect to $o_o$ is equal to:

− 3(correction with the respect to $y_c^2$) + 3 (correction with respect to $x_c$) + 4 (correction of $y_c$ with respect to $y_c^2$) = + 1.

For the recess 932, the correction to be made with respect to $o_o$ is equal to:

+ 3 (correction with respect to $y_c^2$) + 2 (correction with respect to $x_c$) + 2 (correction of $y_c$ with respect to $y_c^2$) = + 7.

For the recess 933, the correction to be made with respect to $o_o$ is equal to:

+ 3 (correction with respect to $y_c^2$) −1 (correction with respect to $x_c$) − 1 (correction of $y_c$ with respect to $y_c^2$) = +1.

For the recess 934, the correction to be made with respect to $o_o$ is equal to:

− 3 (correction with respect to $y_c$) − 3 (correction with respect to $x_c$) − 2 (correction of $y_c$ with respect to $y_c^2$) = −8.

The new values of $o$, corrected with respect to $o_a$, as previously shown, are stored in the portion I of the memory M, in their respective recesses, in the form of two components $a$ and $b$ of opening and closure of the valve 29.

These components $a$ and $b$ are chosen in dependence on the corrected value of $o$. Thus, according to the value of $o$, $a$ and $b$ may be chosen in the following manner:

As long as $o$ does not exceed a certain value, only the duration $a$ of opening of the valve 29 is modified;

as soon as $o$ exceeds the value in question, the duration $b$ of closure of the valve 29 is also modified.

In consequence, according to the diagrams of FIGS. 5 and 6, it is found that the automatic regulation utilized provides an extremely flexible and progressive operation for the biochemical oxidation system. In particular, the concentration of gaseous oxygen $O_a$ of the gaseous atmosphere 3 of the said system is able to adapt itself, over a certain range, to all polluting charges applied to the oxygenation zone 1. $O_a$ is in fact capable of varying between 0 and 100%.

According to FIGS. 8 and 11, there will now be explained the method of operation of the regulation system of FIGS. 7 and 10 respectively.

In FIGS. 8 and 11, in which the same references are given to the same parts, a very diagrammatic representation has been given of the oxygenation zone 1 of the liquid mass 2, the upper part of which containing the gaseous atmosphere 3, is closed.

The pre-treated waste water comes in for example through the introduction conduit 4, and the mixed liquor leaves after treatment by the evacuation conduit 5. The arrival of the oxygenation gas, pure oxygen or air enriched in oxygen, coming from the so-called main source 25, shown in FIGS. 7 and 10 is effected over the supply conduit 6.

The mass flow-rate of this source 25 is controlled by the control device shown very symbolically at 7. A control opens or closes the valve 29 according to the order which it receives from the automatic regulation means 10. The quantity of oxygen delivered per unit of time by this main source 25 is termed $0_1$, as previously. It is directed towards the zone 1 by the conduit 9. The mass flow-rate of the oxygenation gas is either nil or is equal to a constant value $q$, depending on the control 8.

The re-cycling of the gaseous atmosphere 3 in the zone 1 is ensured by the conduit 11 and the compressor shown symbolically at 12. This re-cycled atmosphere is injected into the zone 1 by the conduit 9 for example. The quantity of oxygen injected per unit of time into the zone 1 by the auxiliary source constituted by this re-cycling is termed O.

Thus, the total quantity of oxygen injected per unit of time at 9 into the zone 1, termed $o_3$, is the sum of the quantities of oxygen delivered per unit of time from the main source $O_1$ and the auxiliary source $O_2$. In order to vary this quantity $O_3$, it is thus possible to act on $O_1$ and/or on $O_2$.

The method according to the invention consists mainly of varying the quantities $O_1$ and $O_2$ in order to maintain within pre-determined limits, the three parameters to be regulated, namely the total pressure P of the gaseous atmosphere 3, the concentration of gaseous oxygen in this atmosphere, namely $O_a$, and the concentration of dissolved oxygen in the liquid mass 3, namely $O_e$.

Thus, by the conventional means 46, 48, 50 and 47, 49 and 51 described in FIGS. 7 and 10, the three parameters P, $O_a$ and $O_e$ are measured. The automatic regulation means 10 compares these measured values z, y, x with the reference values $z_c$, $y_c$, $x_c$, and controls the regulating quantities $0_1$ and $0_2$, as will be explained later.

Generally speaking, the mass flow-rate of the oxygenation gas is either nil of equal to a constant value $q$; the valve 29 being in operation open or closed. As regards the quantity $O_2$, this will depend according to the alternative form considered (FIG. 8 or FIG. 11), on the speed of circulation of the re-cycled gaseous atmosphere, or on the concentration of gaseous oxygen in this atmosphere, that is to say on the parameter $O_a$.

The three parameters P, $O_a$ and $O_e$ used by the method of the invention in order to ensure an automatic regulation of the biochemical oxidation system must, as has been stated, respect pre-determined limits which are defined in the following manner.

On the concentration of dissolved oxygen $o_e$ in the liquid mass 2 will depend the purification of the waste water by the biological reaction. For this parameter, three zones are defined, the limits of these being given by way of indication.

In a first zone, in which $x$ would be comprised between O and $x_b$, 2 ppm for example, the biological efficiency would be reduced. This constitutes a critical zone into which there is no advantage in descending.

In a second zone in which $x$ would be greater than $x_e$, 6 ppm for example, a useless additional expenditure of power would be incurred. The limiting value thus defined represents the value reached with the minimum mechanical oxygenation power for a minimum polluting charge applied to the oxygenation zone 1.

Finally, a third zone comprised between the first two, that is to say for which $x$ is comprised between $x_b$ and $x_e$, is the optimum zone of operation in which the biological life finds satisfactory conditions.

The concentration $O_a$ of a gaseous oxygen in the recycled gaseous atmosphere 3 characterizes the gain in power obtained during the transfer of oxygen towards the biomass. $y_c$ is defined from the effective oxygenation capacity of the biochemical oxidation system for a minimum mechanical power, with a view to observing the conditions fixed for the parameter $O_e$. $y_c$ is for example equal to 45–50%, which ensures a gain of mechanical power of the order of 50% minimum.

With regard to the total pressure P of the recycled gaseous atmosphere 3, this must take account of the general pressure necessary for the suitable flow of the waste water. z should never exceed the economic safety value $z_e$. As long as this value, measured in the form of a back-pressure of water, is not reached, the gases will have no other possibility than solution in the mixed liquor 2 in order to pass out of the biochemical oxidation system. For example, $z_e$ will be fixed at 30 or 40 cm. of back-pressure of water.

The three parameters thus defined and their limiting values thus established, the method of automatic regulation according to the invention consists of measuring continuously these three parameters in the biochemical oxidation system considered and of regulating the quantity of oxygen $O_3$ in order that their limiting values may be respected.

This is effected by a system of interrogation with corresponding orders, as will now be described. The whole of these interrogations and the despatch of the corresponding orders to the biochemical oxidation system are effected by automatic regulation means 20 and 10, described with reference to FIGS. 8 and 11 respectively.

The interrogations relate to the three parameters P, $O_a$, $O_e$, and the corresponding orders are established in the following manner.

If $z$ is greater than the value previously defined, ($z_e$), P > 30 for example, the automatic regulation means 10 of FIG. 11 effects the closure of the value 29. $O_1$ is nil and only $O_2$ is active in the supply of oxygen to the above system.

Only the so-called normal re-cycling operates in this case, that is to say that provided by the compressor 12 with a constant $y_c$ equal for example to 45% as previously defined. The main source 25 is not operative; the system is only supplied with oxygen by the auxiliary source, constituted by the re-cycling of the gaseous atmosphere 3.

If $z$ is lower than its reference value, P < 30 for example, the interrogation in respect of $y$ may take place.

If $y$ is greater than the reference value $y_c$, 45% for example, the automatic regulation means 10 maintains the closure of the valve 29. Only the normal re-cycling takes place.

If $y$ is lower than the reference value, $y_c$, the interrogation concerning $x$ can be effected.

If $x$ is in the second zone, previously defined, that is to say if $x$ is at most equal to $x_e$, the automatic regulation means 10 still holds the valve 29 closed, and the biochemical oxidation system is still only supplied by the normal re-cycling system.

If $x$ is lower than the value $x_b$, defining the second zone referred to, an additional supply of oxygen to the biochemical oxidation system is necessary.

Two cases may then arise for consideration:

In a first case in which $x$ is in the third zone previously defined, that is to say is comprised between $x_b$ and $x_e$, the automatic regulation means 10 controls the putting into operation of the valve 29, and an additional supply of oxygen is provided from the main source 25.

In a second case, $x$ is in the first zone previously defined, that is to say it is lower than $x_b$. In this case, not only does the automatic regulation means 10 effect the opening of the valve 29 opening the supply from the main source 25, but also the means 10 effects an increase in the quantity of oxygen $O_2$ supplied from the auxiliary source, constituted by the re-cycling of the gaseous atmosphere 3.

It is at this point that appear two alternative forms of the method in accordance with the invention.

In a first alternative form corresponding to FIG. 11, the increase in the quantity of oxygen $O_2$ supplied by the auxiliary source per unit of time is obtained by an increase in the speed of circulation of the re-cycled gaseous atmosphere 3. This is effected by starting-up the second compressor 14 of the re-cycling circuit. This control, effected by an order emitted by the automatic regulation means 10, and transmitted by the control 13, is effected in a time-delayed manner in order to prevent the compressor 14 from being put into operation by momentary variations of $x$. If the putting into operation of this second compressor 14 is not sufficient to bring $x$ up to a value higher than $x_b$, a third compressor 16 is controlled at 15 by the automatic regulation means 10, in the same way as for the compressor 14. A longer time-delay is utilized in this case in order to give the compressor 14 sufficient time to have a substantial effect.

In the second alternative form corresponding to FIG. 8, the speed of circulation of the re-cycled gaseous atmosphere 3 remains constant. The quantity of oxygen $O_2$ is increased by modifying the reference value $y_c$ of $O_a$. This is what is symbolically represented by the control 17 of the automatic regulation means 10.

There will now be described different characteristic of the automatic regulation systems in accordance with FIGS. 5, 7 and 8, 10 and 11, 13, 14, 15.

In accordance with FIGS. 5, 7 and 8, $y_c$ is automatically regulated to a corrected value greater or less than $y_c^2$, respectively as a function of whether $x$ is lower or higher than $x_n$.

According to FIG. 6, $x_n$ is equal to $x_c$, $x_r$, and $x_2$. As previously described with reference to FIGS. 5 and 6, the more $x$ is lower than $x_n$ and in consequence than $x_c$, the more the opening and closure times $a$ and $b$ of the valve 29, stored in the corresponding recesses of the memory M of the programming device 53 permit a corrected value greater than $y_c^2$ to be assigned to $y_c$.

According to FIG. 7, $x_n$ is equal to $x_c$. As has previously been seen, by virtue of the regulator 86 of FIG. 7, there are defined on each side of $x_2$ four automatic regulation intervals of $y_c$ of rows 1 to 4, each comprised between a pre-determined value of $x$, for example $x_1$, and another predetermined value, higher than $x$, for example $x_2$.

The first automatic regulation interval is comprised between $x_o$ and in consequence $x_b$ and $x_1$. By means of the regulator 86, there are automatically assigned to $y_c$ four corrected increasing values, namely $y_c^4$, $y_c^3$, $y_c^1$, $y_c^0$ for the automatic regulation intervals of row 4 to 1 respectively, as previously defined. $y_c$ is automatically regulated to the value $y_c^2$ when $x$ is equal to $x_2$ or $x_n$.

According to FIGS. 5, 7 and 8, 10 and 11, $c$ is regulated as a function of the two other following factors, namely on the one hand the difference between $x$ and $x_b$, and on the other hand the difference between $x$ and $x_e$, $x_b$ and $x_c$ being respectively lower than $x_c$ and higher than $x_c$.

More precisely, according to FIG. 5, to FIGS. 7 and 8 and to FIGS. 10 and 11, $o$ is regulated automatically in the following manner.

Firstly, when $x$ is at most equal to $x_b$, $o$ is automatically regulated to the value $o_b$. According to the diagrams of FIGS. 5 and 6, the condition according to which $x$ is at most equal to $x_b$ corresponds to the fact that the state of the biological oxidation system is represented by a cube 93 located in the zone $i$ of the matrix $m$.

In the recesses of the memory M of the programming device 53, corresponding to the zone $i$, the instructions stored determine a zero duration for the time $b$ of closure of the valve 29, and in consequence a continuous opening of this valve, this being irrespective of the values of $z$ and $y$ with respect to $z_c$ and $y_c$, especially irrespective of the value of $z$ with respect to $z_e$.

In accordance with FIGS. 7 and 9a, the condition by which $x$ is at most equal to $x_b$ corresponds to the fact that the contactors 62, 64, 69 and 75 are in contact with the contact studs 60, 65, 73 and 76 respectively. Under these conditions, according to the diagram of FIG. 9a, the state of the biochemical oxidation system is located in the zone $i$. In this latter, the relay 80 is under tension, which causes the opening of the valve 29 as a result of the opening of the electric line 67, and this on the condition that $z$ is less than $z_c$, and $y$ is lower than its regulated reference value $y_c$. With reference to FIGS. 10 and 12a, the condition by which $x$ is at most equal to $x_b$ involves the same consequences as those described with reference to FIGS. 7 and 9a.

Secondly, when any one of the following conditions is fulfilled, namely:

$z$ is at least equal to $z_c$;

$x$ is at least equal to $x_c$;

$o$ is automatically regulated to a value zero. According to the diagrams of FIGS. 5 and 6, the two conditions referred to correspond to the fact that the state of the biochemical oxidation system is represented by a cube 93 located respectively in the zone $h$ and the zone $j$ of the matrix $m$.

In the recesses of the memory M of the programming device 53, corresponding to the zones $h$ and $j$ of the matrix $m$, the instructions stored enable a value zero to be assigned to the duration $a$ of the opening time of the valve 29, and in consequence a zero value to $o$.

According to FIGS. 7 and 9a, the two above conditions correspond to the fact that the contactors 62 and 69 are in contact with the studs 61 and 74 respectively, which enables the operating device 7 to be put under tension, and in consequence permits the closure of the valve 29. In consequence, in the zone $j$ of the diagram of FIG. 9a, the valve 29 is closed. As regards FIGS. 10 and 12a, the two above conditions result in the same consequences as those stated with reference to FIGS. 7 and 9a.

Thirdly, when $z$ is less than $z_c$, and when $x$ is lower than $x_c$, $o$ is automatically regulated, at least as a function on the one hand of the difference between $y$ and $y_c$, and on the other hand the difference between $x$ and $x_c$ or $x_b$. According to FIGS. 5 and 6, the above conditions correspond to the fact that the state of the biochemical oxidation system is represented by a cube 93 situated between the zones $i$, $j$ and $h$ of the matrix $m$.

In the working zone thus defined, as has previously been seen, the instructions stored in the corresponding recesses of the memory M of the programming device 53, enable estimated corrected values to be assigned to $o$, especially as a function of the difference between $y$ and $y_c$ and between $x$ and $x_c$.

According to FIGS. 7 and 9a, but also according to FIGS. 10 and 12a, the above-conditions correspond to the fact that the contactors 62, 69 and 75 are in contact with the studs 60, 73 and 77 respectively.

Under these conditions, the automatic regulation of $o$ depends first on the difference between $y$ and $y_c$; if $y$ is at least equal to $y_c$, that is to say if the contactor 64 is in contact with the stud 66, the control device 7 is put under tension, the valve 9 is thus closed, no supply of oxygenation gas is effected, $\sigma$ is automatically regulated to a value zero, and the biochemical oxidation system is situated in the zone $l$ of the diagrams of FIGS. 9a and 12a.

When $y$ is less than $y_c$, it is then necessary to distinguish between the cases of FIGS. 7 and 10 respectively. According to FIG. 7, when the contactor 64 is in contact with the stud 65, $o$ is then regulated, by means of the impulse regulator 92, as a function of the difference between $x$ and $x_c$ or $x_b$ and this is effected in the manner described later.

According to FIG. 10, when the contactor 64 is in contact with the stud 65, $o$ is also regulated as a function of the difference between $x$ and $x_c$, through the intermediary of the regulator 91, since in this case $x_r$ is equal to $x_c$ and to $x_b$. In fact, in this case, when $x$ is less than $x_b$ and in consequence to $x_c$, the corrective reference value $a_c$, transmitted to the impulse generator 90, modifies the opening time of the valve 29 and in consequence the value of $o$.

In conclusion, in the case of FIGS. 9a and 12a, the working zone $k$ corresponds to an automatic regulation of $o$ as a function of the difference between $x$ and $x_c$.

It should be noted that the values $x_b$ and $x_e$ permit an approximate automatic regulation of $o$ to be effected as a function firstly of the difference between $x$ and a first reference value $x_c^1$ equal to $x_b$, and secondly the difference between $x$ and a second reference value $x_c^2$, equal to $x_e$. For that purpose, it is only necessary to open the valve 29 automatically and consequently to regulate $o$ automatically to a pre-determined and fixed value when $x$ is at most equal to the first reference value referred to, and to close the valve 29 automatically and consequently to bring $o$ to nil, when $x$ is at least equal to the second reference value above-mentioned.

As has previously been seen, according to FIGS. 7 and 10 when $y$ is at least equal to $y_c$, corrected or not, $o$ is automatically regulated to a nil value as a result of the closure of the valve 29. When $y$ is less than $y_c$, $o$ is regulated automatically as a function of the difference between $x$ and $x_c$, by means of the impulse regulator 92 according to FIG. 7, or of the regulator 91 coupled to the impulse generator 90 of FIG. 10.

According to FIGS. 5 and 7, $o$ is automatically regulated to a corrected value varying on each side of $\sigma_o$ in the reverse sense of the variation of $x$ on each side of $x_c$.

In fact, as regards FIG. 5, discussion of the diagram of FIG. 6 has made it possible to establish that on the one hand $o$ is increased with respect to $\sigma_o$, when $x$ diminishes with respect to $x_c$, and on the other hand $o$ is reduced with respect to $O_o$ when $x$ increases with respect to $x$.

As regards FIG. 7, by means of the impulse regulator 92 and the regulator 86, an automatic regulation of $o$ on each side of $\sigma_o$ in the reverse sense of the variation of $x$ on each side of $x_c$. To this end, the operation is carried out as follows:

Firstly, the supply of oxygenation gas to the oxygenation zone 1 of the device 44 is effected in a fractional manner as previously described, that is to say it comprises a plurality of successive sequences of duration $c$, each comprising a supply period of oxygenation gas of duration $a$, followed by a period of interruption of supply of oxygenation gas having a duration $b$.

Secondly, according to FIGS. 9b and 9c, by means of the impulse regulator 82, at least one of the following regulations can be carried out:

(1) $a$ is automatically regulated to a corrected value varying on each side of $a_o$, in the opposite direction to the variation of $x$ on each side of $x_c$;

(2) $b$ is automatically regulated to a corrected value varying on each side of $b_o$ in the same direction as the variation of $x$ on each side of $x_c$.

More precisely, in conformity with FIGS. 9b and 9c, it is chosen to regulate automatically $a$, and not $b$, to a corrected value varying on each side of a regulated reference value $a_c$ in the opposite direction to the variation of $x$ on each side of $x_c$. By virtue of the proportional action of the impulse regulator 82, the difference between $a$ and $a_c$ is proportional to the difference between $x$ and $x_e$.

Furthermore, by means of the regulator 86, $a_c$ is automatically regulated to corrected values $a_c^0$, $a_c^1$, $a_c^3$, $a_c^4$ greater or less than $a_c^0$, and consequently than $a_o$, as a function respectively of whether it is lower or higher than $x$ with respect to $x_n$. In other words, $a_c$ is automatically regulated as a function of the position of $x$ with respect to the various intervals of automatic regulation of the regulator 86, with the row 1 to 4.

In a similar manner of course, the impulse regulator 82 could be utilized to regulate $b$ automatically instead of $a$, on each side of $b_c$, this latter value being itself automatically regulated by the regulator 86 to corrected values $b_c^0$, $b_c^1$, $b_c^3$, $b_c^4$, varying on each side of $b_c^2$, the whole respectively as a function of whether $x$ is less than or greater than $x_r$, equal to $x_n$.

Finally, if reference is now made to $o$, which depends on the values $a$ and $b$, it may be said that the impulse regulator 82 enables the automatic regulation of $o$ to a corrected value varying on each side of $o_o$, in a direction opposite to the variation of $x$ on each side of $x_c$. Also, by virtue of the proportional action of the regulator 8 $\sigma$ is automatically regulated to a corrected value varying on each side of the regulated quantity $\sigma_c$, and the difference between $o$ and $o_c$ is proportional to the difference between $x$ and $x_c$.

Similarly, it may be said that the regulator 86 of FIG. 7 makes it possible to regulate $o_c$ automatically on each side of $\sigma_c^2$ equal to $\sigma_o$ to corrected values $o_c^0$, $o_c^1$, $o_c^3$, $o_c^4$, greater or less than $o_O$, respectively as a function of whether $x$ is lower than or greater than $x_r$, equal in the present case to $x_n$ and to $x_e$.

Similarly, it may be said that the regulator 86 defines, on each side of $x_n$, four automatic intervals of regulation of $o_c$ having the row 1 to 4, each comprised between a pre-determined value of $x$, for example $x_1$, and another pre-determined value greater than $x$, for example $x_2$. The first interval of automatic regulation is comprised between $x_o$, equal to $x_b$, and $x_1$. The regulator 86 permits the assignment to $O_c$ of four increasing corrected values, namely $O_c^4$, $O_c^3$, $O_c^1$, $O_c^0$ for the intervals of automatic regulation of the regulator 6, of row 4 to 1 respectively. Also $O_c$ is automatically regulated to the value $O_c^2$, equal to $O_o$, when $x$ is equal to $x_n$.

The automatic regulation system in accordance with FIG. 10 is essentially distinguished from those shown in FIGS. 5 and 7 by the following points:

Firstly, the first regulating quantity chosen is 17 and not $O'_a$. Correlatively, $p$ is automatically regulated to a corrected value higher than $p_O$, as a function of the inferiority of $x$ with respect to $x_r$.

Secondly, the regulator 91 permits the definition of two intervals of automatic regulation of $p$ of row 1 and 2, each comprises between a pre-determined value of $x$, for example $x_1$, and another pre-determined lower value, for example $x_o$. The first interval of automatic regulation is comprised between $x_r$ (equal to $x_2$ and $x_b$) and $x_1$. The regulator 91 permits the automatic assignment to $p$ of two corrected increasing values $p_1$ and $p_o$ for the intervals of automatic regulation defined on the regulator 91, of row 1 and 2 respectively; also $p$ is automatically regulated to its value $p_2$ when $x$ is at least equal to $x_e$.

Thirdly, the system according to FIGS. 10 and 11 comprises in combination the following characteristics;

(1) In the whole of the oxygenation zone 1, all the gaseous atmosphere 3 is caused to circulate in contact with all the liquid mass 2 of the biochemical oxidation system, by means of a mechanical oxygenation means comprising $(2 + 1)$ re-cycling compressors in parallel, namely 12, 14 and 16, each sucking-in the gaseous atmosphere 3 on one side and each delivering the indrawn atmosphere on the other side into the liquid mass 2;

(2) With reference to FIGS. 12c and 12d, a so-called nominal re-cycling compressor, for example the compressor 12, is chosen from the $(2 + 1)$ compressors referred to. This nominal re-cycling compressor operates continuously, consuming the nominal value $p_2$ of mechanical power;

(3) As a function of the value of $x$ with respect to the two intervals of automatic regulation of $p$, defined on the regulator 91, that is to say as a function of the interval of row 1 or 2 in which $x$ is situated, one or two additional re-cycling compressors are put into operation automatically, for example the compressor 14 or the compressors 14 and 16.

Fourthly, by virtue of the regulator 91 and the zero-resetting device 89, $p$ is automatically regulated to a corrected value, namely $p_1$ or $p_o$, when $x$ is at most equal to $x_b$ (equal to $x_r$) and $p$ is automatically regulated to the value $p_2$, when $x$ is at least equal to $x_e$, greater than $x_r$.

Fifthly, $o$ is automatically regulated following the method of procedure below:

(1) When $x$ is at most equal to $x_b$, when $y$ is less than $y_c$, and when $z$ is less than $z_c$, that is to say than $z_e$ in the case of FIG. 10, $o$ is automatically regulated to the value $o_b$ (higher than $\sigma_o$) corresponding to the continuous opening of the valve 29;

(2) When any one of the three following conditions is fulfilled, namely:

$z$ is at least equal to $z_c$, that is to say to $z_e$;
$y$ is at least equal to $y_c$;
$x$ is at least equal to $x_e$;
$o$ is automatically regulated to a nil value;

(3) when the three following conditions are fulfilled namely:

$z$ is less than $z_c$, that is to say to $z_e$;
$y$ is less than $y_c$;
$x$ is lower than $x_c$ but higher than $x_b$;

$o$ is automatically regulated to its reference value $o_c$, this value being capable of regulation by means of the regulator 91, as previously described.

In accordance with FIGS. 5, 7 and 8, 10 and 11, 13, 15, the oxygenation device 44 employed comprises a conduit 32 and a regulating valve 33 having the following function:

On the one hand, by means of the valve 33, $z$ is maintained at a value at most equal to $z_f$, by regulation of the quantity of the gaseous atmosphere 3 of the biochemical oxidation system evacuated per unit of time from the oxygenation zone 1 to the ambient air;

On the other hand, by means of the valve 33, the above-stated quantity is automatically regulated to a value other than zero, when $z$ is at least equal to $z_f$ and the said quantity is automatically regulated to a nil value when $z$ is lower than $z_f$.

According to FIGS. 5 and 13, $z_f$ is greater than $z_e$, which is in turn greater than $z_c$. According to FIGS. 7 and 10, $z_c$ is equal to $z_e$ and therefore $z_f$ is greater only than $z_e$.

Generally speaking, $z_c$, equal or not to $z_e$, is at least equal to atmospheric pressure.

In accordance with FIGS. 5, 7 and 8, 10 and 11, 13, the conduit 42 and the regulating valve 43 have the following function:

On the one hand, by means of the valve 43, $z$ is maintained at a value at least equal to $z_1$, by the regulation of the quantity of atmospheric or ambient air supplying the oxygenation zone 1 per unit of time;

On the other hand, again by means of the regulating valve 4 the above-mentioned quantity is automatically regulated to a value other than zero, when $z$ is at most equal to $z_i$, and the said quantity is automatically regulated to a zero value when $z$ is greater than $z_i$.

Generally speaking, $z_i$ is lower than $z_c$, whether $z_c$ is equal to $z_e$ or not.

When the polluting charge applied to the oxygenation zone 1 is relatively small, and must less than the nominal charge estimated, the characteristic previously defined makes it possible to utilize atmospheric air and not an oxygenation gas rich in oxygen for the biological purification of the pre-treated waste water.

In this way, the oxygenation gas is reserved and utilized for the biological purification of polluting charges at least equal to the nominal estimated charge. Under these conditions, the concentration of gaseous oxygen in the gaseous atmosphere 3 may fall below the concentration of gaseous oxygen in atmospheric air, namely 20%.

According to FIG. 14, the oxygenation process is of the multi-stage continuous type and is distinguished by this fact from an oxygenation of the single stage continuous type by the following points:

(1) The oxygenation zone comprises three oxygenation compartments 92a, 92b and 92c. The liquid mass and the gaseous atmosphere 3 of the biochemical oxidation system circulate in concurrent flow with respect to each other, successively from the first compartment 82a to the last compartment 92c;

(2) the oxygenation gas coming from the source 25 supplies the first compartment 92a through the conduit 9, while at least part of the gaseous atmosphere 3 is evacuated to the ambient air from the last compartment 92c, through the conduit 32 and the valve 33;

(3) in each compartment 92 constituting the portion of the oxygenation zone 1, by means of a mechanical oxygenation means 12a or 12b or 12c, one of the constituents of the local biochemical oxidation system is circulated, namely the portion 2a or 2b or 2c of the liquid mass 2, and the portion 3a or 3b or 3c of the gaseous atmosphere 3, each limited by each oxygenation compartment 92 in contact with the other.

According to FIG. 13, the method of automatic regulation utilized is characterized by the following points:

(1) The quantity of polluting bio-degradable materials (material oxidizable by biochemical process) introduced continuously per unit of time into the waste water treatment installation, and more precisely into the oxygenation zone 1 is characterized by the two previously defined parameters of oxidation level, namely D and DTO.

The value of these two parameters is detected on the flow of waste water to be treated, on the upstream side of the oxygenation zone 1, by means of the detectors 55 and 56 respectively. Corresponding analogue signals, namely $v$ and $w$ respectively are transmitted by the transmitters 57 and 58 respectively, by means of the automatic regulation 20 and more precisely by the programming device 53;

(2) By means of the programme P and the information I stored in the memory M, the regulating quantities previously chosen, that is to say $y_c$ and $o$ (namely $a$ and/or $b$), at least as a function on the one hand of the difference between $w$ and $w_o$, and on the other hand of the difference between $v$ and $v_o$.

In the same manner as previously, $p$ could also be regulated instead of $y_c$, at least as a function of the difference of $w$ with respect of $w_o$ and of the difference of $v$ with respect to $v_o$.

In accordance with FIG. 13, the regulation of $y_c$ and of $o$ as a function of $v$ and $w$ is effected in the following manner:

(1) In the same manner as in FIG. 5, all the different states of the biochemical oxidation system, generated respectively by all the different polluting charges applied to the oxygenation zone 1 have been indexed and represented by different cubes 93, distributed in several matrices $m_1$, $m_2$ and $m_3$. All these three-dimensional matrices $m_1$, $m_2$, $m_3$ each correspond respectively to different states of reference to the biochemical oxidation system, namely $C_1$, $C_2$, $C_3$, each located approximately in the centre of the matrices $m_1$, $m_2$ and $m_3$.

The matrices $m_1$, $m_2$ and $m_3$ represent pre-determined zones of working of the biochemical oxidation system, and thus correspond to pre-determined ranges of biochemical consumption of oxygen different from each other, and in consequence to respectively different levels of oxidation to obtain;

(2) In correspondence with the matrices $m_1$, $m_2$, $m_3$, the portion I of the memory M comprises three assemblies of recesses, corresponding respectively to the various zones of working of the biochemical oxidation system, previously defined. As before, all the recesses of the various assemblies referred to contain instructions concerning the times of opening $a$ and closure $b$ of the valve 29;

(3) Before carrying out in a repetitive manner the main operations described with reference to FIG. 5, the programme P stored in the memory M enables the following preliminary operations to be carried out:

Successive interrogations of the transmitters 57 and 58; conversion in the converter 54 of the corresponding analogue detection signals $v$ and $w$ to digital detection signals $v_t$ and $w_t$ respectively;

Comparison of the digital detection signals $v_t$ and $w_t$ with the various values of $v$ and $w$ corresponding to the matrices $m_1$, $m_2$ and $m_3$ respectively. Thus, when $v_t$ and $w_t$ are close to the rated values, $v_0$ and $w_0$, the matrix $m_2$ is retained; when $v_t$ and $w_t$ are very much less than $v_0$ and $w_0$, the matrix $m_1$ is retained; and when $v_t$ and $w_t$ are very much higher than $v_0$ and $w_0$, the matrix $m_3$ is retained;

Once the working matrix has been chosen, the programme P is carried out as defined with reference to FIG. 5.

Taking account of the operation of the automatic regulation system in accordance with FIG. 13, the modification of the state of reference C of the biochemical oxidation system, as a function of the difference between the values $v$ and $w$ with respect to $v_0$ and $w_0$ have the effect of automatically regulating $y_c$ and $o$ on each side of their rated value, i.e. $y_c^2$ and $o_0$ respectively, in the same direction as the variation of the parameters $v$ and $w$ on each side of their rated value $v_0$ and $w_0$ respectively.

This automatic regulation of $y_c$ and $o$ is obtained by means of the modification of the state of reference of the biochemical oxidation system, according to the following methods:

(1) The state of reference C of the biochemical oxidation system and in consequence the values of reference $x_c$, $y_c$ and $z_c$ are automatically modified as a function of the difference between $v$ and $v_0$ and of the difference between $w$ and $w_0$;

(2) In this way, $y_c$ and $o$ are automatically regulated, at least in dependence on the difference between $v$ and $v_0$, and on the difference between $w$ and $w_0$.

What we claim is:

1. A method of biochemical treatment of a liquid mass comprising water with an oxidizable material, in an oxygenation zone comprising a gaseous atmosphere including oxygen surmounting said liquid mass, comprising the following operations:
   1. in a first step introducing an oxygenation gas, comprising more than 50% by volume of oxygen supplied from an external source into the heart of the liquid mass in the form of bubbles, the duration (a) of said introduction step being at most equal to the mean duration (d) of travel of said bubbles up to the inter-face between said gaseous atmosphere and said liquid mass;
   2. in a second step effecting a circulation of either said liquid mass or said gaseous atmosphere in contact one with the other by the use of mechanical oxygenation, the duration (b) of said circulation step being at least equal to the mean duration (d) of travel of the bubbles of the oxygenation gas in the liquid mass;
   3. cyclically repeating steps 1 and 2; and
   4. maintaining at least one of the following parameters namely the duration (b) of said circulation step, the total period (a + b) of said sequence, and the mass flow-rate of the oxygenation gas, such that the mean rate of flow of oxygenation gas to said oxygenation zone corresponds substantially to the consumption of oxygen.

2. A method as claimed in claim 1 in which the oxygenation gas and the gaseous atmosphere are introduced into the heart of the liquid mass, into the same zone of upwardly moving gaseous circulation and by the same gaseous introduction means, the introduction pressure of said oxygenation gas being higher than the introduction pressure of said gaseous atmosphere into the heart of said liquid mass.

3. A method as claimed in claim 1 comprising automatically regulating the biochemical oxidation system comprising:
   detecting at least the three following parameters to be regulated, namely the total pressure of the gaseous atmosphere, the concentration of gaseous oxygen in the gaseous atmosphere and the concentration of dissolved oxygen in at least one portion of said liquid mass;
   maintaining the above three parameters at reference values by regulating at least two quantities, namely firstly the concentration of gaseous oxygen in the gaseous atmosphere or the degree of the mechanical oxygenation, and secondly the rate of oxygenation gas supplied;
   said first quantity being regulated in dependence of at least the difference between the detected concentration of dissolved oxygen and a reference value;
   said second quantity being regulated in dependence of at least three following factors: firstly the difference between the detected total pressure and its reference value, secondly the difference between the detected concentration of gaseous oxygen and its reference value, and thirdly the difference between the concentration of dissolved oxygen and its reference value.

4. A method as claimed in claim 3 in which:
   the first quantity is the concentration of gaseous oxygen;
   the reference value of the second parameter is automatically regulated at least in dependence on the difference between the detected value of the third parameter and its reference value;
   the second quantity is automatically regulated in dependence on the difference between the reference value of the second parameter and the nominal reference value of said second parameter corresponding to the normal operation.

5. A method as claimed in claim 4 in which the reference value of said second parameter is automatically regulated to a corrected value higher or lower than the nominal value of the reference value of said second parameter, in dependence on whether the detected value of the third parameter is lower or higher with respct to a nominal value of this latter corresponding to the normal working.

6. A method as claimed in claim 3 in which the second quantity is automatically regulated to a corrected value varying on each side of a nominal value corresponding to the normal operation in the direction opposite to the variation of the detected value of said third parameter on each saide of the reference value of said parameter.

7. A method as claimed in claim 3 in which the first quantity is the degree of said mechanical oxygenation, said degree of mechanical oxygenation being automatically regulated to a corrected value higher than the nominal value thereof depending on whether the detected value of the third parameter is less than the reference value of said parameter.

8. A method as claimed in claim 3 in which firstly the first parameter is maintained at a value at most equal to a predetermined over-pressure safety value, higher than atmospheric pressure and higher than the reference value of said first parameter, by regulation of the quantity of gaseous atmosphere of said biochemical oxidation system evacuated per unit of time from the oxygenation zone to the ambient air, and secondly said quantity is automatically regulated to a value other than zero when the detected value of said first parameter is at least equal to the over-pressure safety value, and said quantity is automatically regulated to a zero value when the detected value of said first parameter is lower than the over-pressure safety value.

9. A method as claimed in claim 3 in which the reference value of said first parameter is at least equal to atmospheric pressure.

* * * * *